(12) United States Patent  
Bartels et al.

(10) Patent No.: US 12,401,049 B2  
(45) Date of Patent: Aug. 26, 2025

(54) ELECTROCHEMICAL MEMBRANE

(71) Applicant: W. L. Gore & Associates, Inc., Newark, DE (US)

(72) Inventors: Joshua M. Bartels, Newark, DE (US); Wen Liu, Newark, DE (US); Alexander L. Agapov, Newark, DE (US)

(73) Assignee: W. L. Gore & Associates, Inc.

( * ) Notice: Subject to any disclaimer, the term of this patent is extended or adjusted under 35 U.S.C. 154(b) by 0 days.

(21) Appl. No.: 18/539,853

(22) Filed: Dec. 14, 2023

(65) Prior Publication Data

US 2024/0128477 A1  Apr. 18, 2024

Related U.S. Application Data

(63) Continuation of application No. PCT/IB2022/055464, filed on Jun. 13, 2022.

(60) Provisional application No. 63/210,083, filed on Jun. 14, 2021.

(51) Int. Cl.
| | |
|---|---|
| *H01M 4/92* | (2006.01) |
| *H01M 4/88* | (2006.01) |
| *H01M 8/10* | (2016.01) |
| *H01M 8/1004* | (2016.01) |
| *H01M 8/1039* | (2016.01) |

(52) U.S. Cl.
CPC ......... *H01M 4/926* (2013.01); *H01M 4/8892* (2013.01); *H01M 8/1004* (2013.01); *H01M 8/1039* (2013.01); *H01M 2008/1095* (2013.01)

(58) Field of Classification Search
CPC ............... H01M 4/926; H01M 4/8892; H01M 8/1004; H01M 8/1039; H01M 2008/1095
See application file for complete search history.

(56) References Cited

U.S. PATENT DOCUMENTS

| | | | |
|---|---|---|---|
| 2011/0104474 A1 | 5/2011 | Liu et al. | |
| 2020/0099061 A1* | 3/2020 | Price | ........................ C25B 13/02 |
| 2021/0384540 A1* | 12/2021 | Mistry | ................ H01M 4/9083 |

FOREIGN PATENT DOCUMENTS

| | | |
|---|---|---|
| WO | 2018/115821 A1 | 6/2018 |
| WO | 2020/148545 A1 | 7/2020 |

OTHER PUBLICATIONS

Briguglio et al., Flammability reduction in a pressurised water electrolyser based on a thin polymer electrolyte membrane through a Pt-alloy catalytic approach, Applied Catalyis B: Environmental, vol. 246, Jun. 5, 2019, pp. 254-265 (Year: 2019).*

(Continued)

*Primary Examiner* — Daniel S Gatewood  
(74) *Attorney, Agent, or Firm* — Faegre Drinker Biddle & Reath LLP

(57) ABSTRACT

This disclosure relates to electrolyzer composite membranes, and in particular, to a composite membrane having at least two reinforcing layers comprising a microporous polymer structure and a surprisingly high resistance to piercing. The electrolyzer composite membranes have a recombination catalyst configured to be disposed closer to an anode than to a cathode in a membrane-electrode assembly (MEA). The disclosure also relates to membrane-electrode assemblies and electrolyzers comprising the membranes, and to method of manufacture of the membranes.

29 Claims, 9 Drawing Sheets

(56) References Cited

OTHER PUBLICATIONS

International Preliminary Report on Patentability received for PCT Patent Application No. PCT/IB2022/055464, mailed on Dec. 28, 2023, 8 pages.
International Search Report and Written Opinion received for PCT Patent Application No. PCT/IB2022/055464, mailed on Feb. 13, 2023, 11 pages.

* cited by examiner

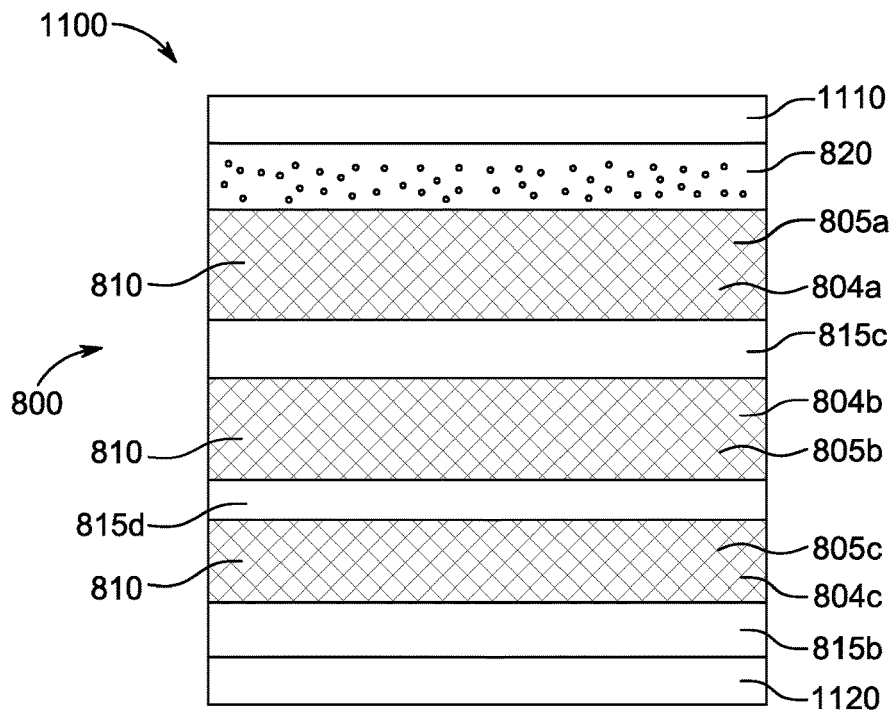
Figure 10
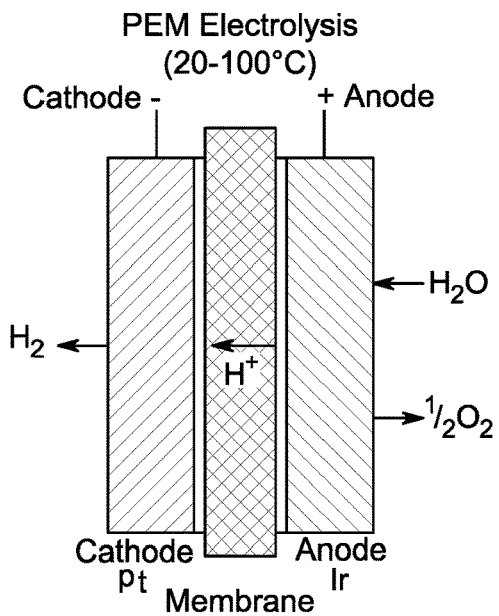
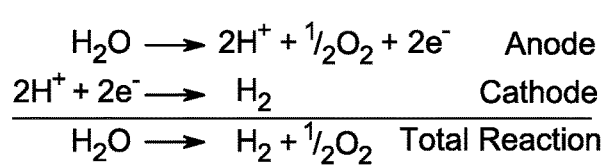
Figure 11

Table 1 – Piercing Resistance Data and PEM Properties

| Sample | Total PEM Thickness at 50% RH (μm) | Reinforcement material | Total Microporous Polymer Structures Content / mpa (g/m²) | Number of Reinforcement Layers | Average Puncture Force (gF [N]) | Number of Unreinforced Ionomer Layers | Thickness of Each Unreinforced Ionomer Layer (μm) | Ionomer EW (cc/mol eq) | Recombination Catalyst Loading in Outer Ionomer Layer (mg(Pt)/cm²) | Hydrogen Crossover at 55 °C and 0.5 A/cm² ($H_2/O_2$ %) at 20 bar |
|---|---|---|---|---|---|---|---|---|---|---|
| Commercial N115 | 122 | N/A | 0 | 0 | 69.85 [0.665] | N/A | N/A | 1100 | N/A | 4.6 |
| Commercial N212 | 51 | N/A | 0 | 0 | 29.88 [0.293] | N/A | N/A | 1100 | N/A | N/A |
| Commercial N211 | 25.4 | N/A | 0 | 0 | 12.28 [0.120] | N/A | N/A | 1100 | N/A | N/A |
| Example 1 | 78.3 | ePTFE 1 | 31.5 | 3 | 72.84 [0.714] | 4 | 11.5 | 710 | 0.085 | 0.34 |
| Comparative Example 1 | 80.2 | ePTFE 2 | 29.5 | 1 | 51.93 [0.509] | 2 | 25.35 | 710 | N/A | N/A |
| Example 2 | 41.4 | ePTFE 1 | 31.5 | 3 | 66.38 [0.651] | 4 | 2.52 | 710 | 0.04 | 0.85 |
| Comparative Example 2 | 40.4 | ePTFE 2 | 29.5 | 1 | 43.58 [0.427] | 2 | 5.45 | 710 | N/A | N/A |
| Example 3 | 80-90 | ePTFE 2 | 59 | 2 | N/A | 3 | 10 | 710 | 0.085 | 0.56 |

Figure 15

Table 2 – Reinforcing Material Properties

| Reinforcement Material | Mass per Area of Each Reinforcing Layer (g/m²) | Noncontact Thickness (μm) | Ball Burst (lbf) | Bubble Point (psi) | Ball Burst, 0.25in Diameter (lbf) | Density (g/cm³) |
|---|---|---|---|---|---|---|
| ePTFE 1 | 10 | 137 | 5.8 | 56.2 | 5.8 | 0.16 |
| ePTFE 2 | 29 | 62.2 | 8.9 | 43.5 | 8.9 | 0.22 |

Figure 16

ELECTROCHEMICAL MEMBRANE

CROSS-REFERENCE TO RELATED APPLICATION

This application is a continuation application of PCT Application No. PCT/IB2022/055464, internationally filed on Jun. 13, 2022, which claims the benefit of U.S. Provisional Application 63/210,083, filed Jun. 14, 2021, which are herein incorporated by reference in their entireties for all purposes.

FIELD

This disclosure relates to polymer electrolyte membranes, and in particular, to a composite membrane having at least two reinforcing layers comprising a microporous polymer structure and having high resistance to piercing.

BACKGROUND

Water electrolysis is a clean source of energy of great interest in order to reduce carbon emissions. During electrolysis, electricity is employed to break water into hydrogen and oxygen to create hydrogen gas. The oxygen generated is either released into the atmosphere or capture or stored, for example to supply to industries or as medical gas. Polymer electrolyte membrane (PEM) water electrolysis is a very promising technology which produces high gas purity, dynamic power range and current density and higher efficiency than the alkaline water electrolysis counterpart. The hydrogen produced during electrolysis can be compressed and later used to power any hydrogen fuel cell electric application.

In an electrolyzer, the half reaction taking place at the anode is: $H_2O \rightarrow O_2 + 2H^+ + 2e^-$. The half reaction taking place at the cathode is: $2H^+ + 2e^- \rightarrow H_2$. $H^+$ cations migrate from the anode to the cathode through the PEM to generate $H_2$ at the cathode side (see FIG. 11). However, it is of vital importance to minimize the molecular hydrogen and oxygen crossover through the PEM because they can negatively affect the Faraday efficiency of the electrolyzer, contribute to the degradation of the PEMs and, importantly, high concentrations of hydrogen at the anode side are a safety concern if the concentration of hydrogen in the hydrogen-oxygen mixture reaches the explosive limit of 4%. Excessive crossover of hydrogen through the PEM can be exacerbated due to cracks or punctures in the PEM.

In electrolyzer applications, the PEM is part of a Membrane Electrode Assembly (MEA). The MEA is the core component of the electrolyzer where the electrochemical reactions take place that generate $H_2$. A typical MEA comprises a PEM coated at either outer surface with a catalyst to form a catalyst coated membrane (CCM) or a PEM having at either side of a catalyst layer (i.e., the anode and the cathode). In some embodiments, the MEA is a five-layer MEA comprising the PEM with the cathode and the anode, and two liquid/gas diffusion layers (a.k.a. fluid transport layers or FTL)), which are attached to the two outer surfaces of the coated catalysts or catalyst layers). Usually, the cathode is a layer of platinum black or carbon-supported platinum (Pt/C) present at a loading in the range of about 1.0-2.0 $mg_{metal}/cm^2$ and the anode is a layer comprising iridium, Ruthenium or platinum oxide (e.g. nanofibers) present at a catalyst loading of about in the range of about 1.0-4.0 $mg_{metal}/cm^2$.

High ion conductance, high durability, minimal hydrogen crossover, and low cost, are all desirable qualities in an electrolyzer PEM. However, as a matter of practical engineering, conflicts often arise in the optimization of these properties, requiring tradeoffs to be accepted. One can attempt to increase conductance via reduction in membrane thickness. Making a PEM thinner also lowers its cost because ionomer is expensive and less of it is used. However, thinner membranes have increased hydrogen permeation, which erodes any conduction gains, and results in thinner membranes having similar or worse conductance than thicker ones. In addition, thinner membranes are also weaker, frequently lacking sufficient mechanical durability for aggressive operation conditions such as high temperature or pressure. Reducing the membranes' physical thickness can also increase the susceptibility to damage or puncture from other electrochemical device components (e.g. fluid transport layers comprising Titanium felts/platinized titanium fiber felts, or meshes), leading to shorter cell lifetimes. Most importantly, hydrogen crossover in electrolyzer applications is dangerous, as if the hydrogen generated at the cathode end of the PEM migrates to the anode and encounters the oxygen stream generated at the anode, a hazardous and potentially explosive reaction between the $H_2$ and the $O_2$ can occur when levels of 5-95% $H_2$ in $O_2$ are reached. Traditionally, PEMs over 100 µm and rather closer to 200 µm thickness are employed in electrolyzer applications in order to try to minimize electrical resistance and improve performance, while maintaining hydrogen crossover to a maximum of 2% $H_2$ in $O_2$ (typically the safety limit is considered to be 50% of the lower explosion limit, which is 4% $H_2$ in $O_2$).

In addition to increasing the thickness of the PEM to an acceptable level in order to minimize hydrogen cross-over, state of the art technology has explored other approaches such as including a recombination catalyst layer (e.g. a platinized current collector), that catalytically reacts any excess permeated hydrogen crossing over from the cathode with oxygen from the anode in a controlled manner to form water, and eventually electrochemically oxidizes the permeated hydrogen to protons. Those protons can then permeate through the PEM again and be reduced at the cathode. Another approach is to employ external catalytic gas recombiners to reduce the gas impurity.

Piercing of PEMs can be particularly problematic in electrolyzer applications, which employ fluid transport layers disposed at either side of the MEA. Electrolyzer fluid transport layers usually comprise a porous layer (typical pore size 1-200 micron) or a metal mesh. The porous layer may comprise, among others, a felt, a paper, a woven material, and the like. Cathode electrolyzer fluid transport layers usually comprise carbon fibers and anode fluid transport layers usually comprise titanium felts, platinized titanium fiber felts, or metal meshes (e.g. titanium metal meshes). The carbon or metal fibers and meshes, upon compression of the fluid transport layers against the MEA (PEM with sandwiched by electrodes) during electrolyzer fabrication, can pierce the PEM. Therefore, access to membranes with higher proton conductance is restricted by membrane piercing resistance requirements.

Ultimately, electrolyzers employing PEMs can fail because of pinholes that develop and propagate through the polymer electrolyte membranes (particularly at the high pressure differentials across the membrane due to the high pressure experienced at the cathode side of the membrane as a result of hydrogen evolution), thus leading to failures and potentially hazardous levels of molecular hydrogen in oxygen as a consequence of hydrogen crossover through those pinholes. In addition, these devices can also fail if electronic current passes through the PEMs, causing the systems to short.

A state of the art approach to improving the mechanical resistance and resistance to piercing properties of PEMs involves reinforcing the polymer electrolyte membrane with a layer of microporous polymer structure. This layer of microporous polymer structure is completely imbibed with a polymer electrolyte (e.g. an ionomer) and it is therefore fully conductive to ions. However, even reinforced PEMs can be subject to piercing upon assembly of the PEM with electrodes and liquid/gas diffusion layers (a.k.a. fluid transport layers or FTL) during membrane-electrode assembly (MEA), electrolyzer fabrication, and during electrolyzer operation.

Accordingly, the need exists for thin composite membranes that retain high performance and low ionic resistance, are stable at the high pressure and temperature working conditions of electrolyzers, and which minimize hydrogen crossover (maintaining hydrogen cross-over below the safety limit of 2% hydrogen in oxygen), while presenting higher resistance to piercing by the electrolyzer components and subsequent shorting than state of the art composite membranes.

SUMMARY

The inventors have endeavored to solve the problems mentioned above. The inventors have surprisingly discovered that, for a given total content of microporous polymer structure and thickness of the PEM at 50% RH, distributing the total content of microporous polymer structure between two or more reinforcing layers increases the resistance to piercing of the PEM by electrolyzer components (e.g. fluid diffusion layer(s) and/or electrode(s)) upon electrolyzer fabrication compared to PEMs having the same content of reinforcement material in a single reinforcing layer. This maximizes the mechanical resistance of the membranes for a given content of reinforcing structure, while minimizing the hydrogen cross-over through the electrolyzer composite membrane, and therefore enables the reduction of the thickness of the membranes compared to state of the art electrolyzer composite membranes. Furthermore, the addition of a recombination catalyst to the electrolyzer composite membranes which, in an MEA is disposed closer to the anode than to the cathode, or near or adjacent to the anode, further catalyzes the reduction of any hydrogen that may have permeated from the cathode towards the anode before it reaches the anode in a controlled manner. Therefore, the electrolyzer composite membranes disclosed herein present minimal hydrogen crossover, even in embodiments in which the electrolyzer composite membranes are much thinner than state of the art electrolyzer composite membranes.

In a first aspect there is provided an electrolyzer composite membrane comprising:
  a) at least two reinforcing layers, each of said at least two reinforcing layers comprising a microporous polymer structure; and
  b) an ion exchange material (IEM) at least partially imbibed within the microporous polymer structure of each of the at least two reinforcing layers and rendering the microporous polymer structure occlusive; and
  c) a recombination catalyst.

The recombination catalyst may be configured to be disposed closer to an anode than to a cathode of an electrolyzer composite membrane-electrode assembly (MEA). The recombination catalyst may be configured to be disposed adjacent to an anode of an electrolyzer composite membrane-electrode assembly (MEA). Within the context of this disclosure, adjacent to the anode may mean that the recombination catalyst is closer to the anode than to the cathode in a MEA. A portion of the electrolyzer composite membrane which is disposed adjacent to the anode may be disposed in contact with the anode. The recombination catalyst may be disposed in contact with an anode. Within the context of this disclosure, "in contact with" comprises "in direct contact with" and "in indirect contact with". Therefore, in some embodiments, the recombination catalyst may be disposed in direct contact with the anode (without any intervening layers or elements). In other embodiments, the recombination catalyst may be disposed in indirect contact with the anode. In those embodiments, there may be at least one intervening layer or layers between the recombination catalyst and the anode. The electrolyzer composite membrane may comprise a recombination catalyst which is configured to be disposed closer to the anode than to the cathode in a MEA but not in direct contact with the anode. For example, the electrolyzer composite membrane may comprise one or more a layers of ionomer dispose between the recombination catalyst and the anode. The electrolyzer composite membrane may be configured to comprise one or more additives disposed between the recombination catalyst and the anode in a MEA. The electrolyzer composite membrane may have a recombination catalyst (e.g. a recombination catalyst layer) disposed at an outermost surface of the membrane which, in use, is configured to be in contact with an anode without any other intervening layers. The recombination catalyst may extend into the electrolyzer composite membrane from the anode outermost surface of the membrane (i.e. the surface of the membrane which is configured to be disposed adjacent to or in contact with the anode). For example, the recombination catalyst may extend from the outermost surface of the membrane to about half of the thickness of the membrane.

The electrolyzer composite membrane thickness may be measured from the surface which, in use is configured to be disposed in contact with the cathode to the surface which, in use, is configured to be disposed in contact with the anode. The recombination catalyst may be present in about 1% to about 50% of the thickness of the electrolyzer composite membrane. The location of the recombination catalyst within the electrolyzer composite membrane may be defined with reference to the thickness of the membrane and the outermost surfaces of the membrane which are in contact with a cathode and an anode respectively. In some embodiments, the recombination catalyst may be present in the outermost surf ace of the electrolyzer composite membrane which is configured to be disposed in contact with an anode and it may extend into the membrane, being present within about ½ to about ⅟₂₅, or from about ⅟₂₅ to about ⅟₁₀, or from about ⅟₁₀ to about ⁵⁄₁₀₀, or from about ⁵⁄₁₀₀ to about ⅟₁₀₀ of the thickness of the membrane. of the thickness of the membrane. In some embodiments, the recombination catalyst may be present in a discrete layer. For example, the recombination catalyst may be mixed with ionomer and be located as a layer on the outermost surface of the electrolyzer composite membrane which, in use, is configured to be in contact with an anode. The recombination catalyst may be present in a catalyst support. The recombination catalyst may be dispersed within part of the thickness of the membrane. The recombination catalyst may be imbibed within at least one of the reinforcing layers of the electrolyzer composite membrane.

The electrolyzer composite membrane may have a thickness at 50% RH of at least 30 μm. The microporous polymer structures may be present in a total amount of at least about 10 vol % based on the total volume of the composite membrane.

The recombination catalyst may be a catalyst capable of catalysing the reaction between molecular hydrogen and molecular oxygen to produce water. In other words, the recombination catalyst may be a molecular hydrogen decomposition catalyst. The recombination catalyst may comprise a single recombination catalyst species or a mixture of recombination catalyst species. The recombination catalyst may comprise one or more catalytic species selected from: Pt, Ir, Ni, Co, Pd, Ti, Sn, Ta, Nb, Sb, Pb, Mn, and Ru, their oxides, and mixtures thereof. The recombination catalyst may comprise a platinum group metal (Group 10 metal) such as platinum, palladium, iridium, rhodium, ruthenium or osmium; alloys of platinum group metals; and mixed oxides of platinum group metals with other metals such as cerium and titanium, and mixtures thereof; or wherein the recombination catalyst comprises one or more of Pt, Ir, Ni, Co, Pd, Ti, Sn, Ta, Nb, Sb, Pb, Mn, and Ru, their oxides and mixtures thereof. The recombination catalyst may comprise a single recombination catalyst species or a mixture of recombination catalyst species. The recombination catalyst may be mixed with ion exchange material, and/or the recombination catalyst may be present on a recombination catalyst support material.

The recombination catalyst may be present in a recombination catalyst layer configured to be closer to the anode than to the cathode in a MEA or an electrolyzer. The recombination catalyst may be dispersed throughout at least part of the composite electrolyte membrane. Within the context of the present disclosure, in all cases at least part of the recombination catalyst may be configured to be disposed closer to the anode than to the cathode in a MEA or electrolyzer. The recombination catalyst or recombination catalyst layer may comprise one or more recombination catalyst species and optionally it may further comprise at least one of an ion exchange material or a support, such as carbon particulate. The recombination catalyst metal species may be mixed with a support (e.g. carbon black) and coated onto the composite membrane. In other embodiments, the recombination catalyst metal species may be mixed with a support (e.g. carbon black or ionomer), and be laminated on the composite membrane.

The support material may comprise silica; zeolites; carbon; and oxides and carbides of the group IVB, VB, VIB VIIB, and VIII transition metals; and combinations thereof. Carbon is a particularly preferable support material. They preferably have high surface area, and so should be small in size, less than 75 nm, or preferably less than 50 nm, or less than 25 nm. They may also optionally be porous. The use of high surface area supports is particularly advantageous because it allows the recombination catalyst to be highly dispersed, leading to higher catalytic activity per unit weight compared with an unsupported, lower surface area catalysts of the same composition.

The recombination catalyst may be present in a recombination catalyst layer configured to be disposed closer to an anode than to a cathode in an electrolyzer composite membrane electrode assembly (MEA) and/or in an electrolyzer. The electrolyzer composite membrane may define a cathode outermost surface configured to be disposed closer to a cathode than to an anode in an electrolyzer composite membrane electrode assembly or in an electrolyzer device, and an anode outermost surface configured to be disposed closer to an anode side than to the cathode in an electrolyzer device, or an electrolyzer composite membrane electrode assembly. Each of the least two reinforcing layers may define a first surface and a second surface opposite the first surface, and wherein the first surface of a reinforcing layer that is configured to be disposed at or near the cathode is the cathode outermost surface and the second surface of a reinforcing layer that is configured to be disposed at or near the anode is the anode outermost surface.

The recombination catalyst may be present at a loading of less than 0.1 mg/cm$^2$ in the composite electrolyte membrane. The recombination catalyst may be present at a loading in the range of from about 0.0001 mg/cm$^2$ to about 0.1 mg/cm$^2$, or from about 0.0005 mg/cm$^2$ to about 0.1 mg/cm$^2$, or from about 0.0008 mg/cm$^2$ to about 0.1 mg/cm$^2$, or from about 0.001 mg/cm$^2$ to about 0.1 mg/cm$^2$, or from about 0.0015 mg/cm$^2$ to about 0.1 mg/cm$^2$, or from about 0.002 mg/cm$^2$ to about 0.1 mg/cm$^2$, or from about 0.0025 mg/cm$^2$ to about 0.1 mg/cm$^2$, or from about 0.003 mg/cm$^2$ to about 0.1 mg/cm$^2$, or from about 0.0043 mg/cm$^2$ to about 0.0.005 mg/cm$^2$, or from about 0.0035 mg/cm$^2$ to about 0.1 mg/cm$^2$, or from about 0.005 mg/cm$^2$ to about 0.1 mg/cm$^2$, or from about 0.007 mg/cm$^2$ to about 0.1 mg/cm$^2$, or from about 0.009 mg/cm$^2$ to about 0.1 mg/cm$^2$, or from about 0.01 mg/cm$^2$ to about 0.1 mg/cm$^2$, or from about 0.04 mg/cm$^2$ to about 0.1 mg/cm$^2$, or from about 0.085 mg/cm$^2$ to about 0.1 mg/cm$^2$, or from about 0.013 mg/cm$^2$ to about 0.015 mg/cm$^2$, or from about 0.0001 mg/cm$^2$ to about 0.001 mg/cm$^2$, or from about 0.0001 mg/cm$^2$ to about 0.005 mg/cm$^2$, or from about 0.0001 mg/cm$^2$ to about 0.008 mg/cm$^2$, or from about 0.0001 mg/cm$^2$ to about 0.01 mg/cm$^2$, or from about 0.0001 mg/cm$^2$ to about 0.05 mg/cm$^2$, or from about 0.001 mg/cm$^2$ to about 0.01 mg/cm$^2$, or from about 0.004 mg/cm$^2$ to about 0.01 mg/cm$^2$, in the composite electrolyte membrane.

Water electrolyzers may experience an unwanted side reaction between hydrogen and oxygen to form hydrogen peroxide ($H_2O_2$), which may decompose into peroxide radicals that can attack the membrane and electrolyzer components. To mitigate this problem, the electrolyzer composite membrane may further comprise an additive to decompose hydrogen peroxide and/or to eliminate the peroxide radicals. The additive may be a peroxide decomposition catalyst, a radical scavenger, a free radical decomposition catalyst, a self-regenerating antioxidant, a hydrogen donor primary antioxidant, a free radical scavenger secondary antioxidant, an oxygen absorbent, and the like. The additive may comprise Ce, Mn or their oxides. For example, the additive may be a cerium dioxide (ceria). For the avoidance of doubt, the additive may be added in addition to the recombination catalyst.

The electrolyzer composite membrane may comprise two reinforcing layers. The composite membrane may comprise three reinforcing layers. The electrolyzer composite membrane may comprise four reinforcing layers. The electrolyzer composite membrane may comprise five reinforcing layers. The electrolyzer composite membrane may comprise from two to 10 reinforcing layers. The electrolyzer composite membrane may comprise any suitable number of reinforcing layers.

The electrolyzer composite membrane may define a first composite membrane surface and a second composite membrane surface opposite the first composite membrane surface. The ion exchange material may be present in at least one layer at the first composite membrane surface and/or the second composite membrane surface. The electrolyzer composite membrane may comprise a first layer of ion exchange material on the first composite membrane surface. The electrolyzer composite membrane may comprise second layer of ion exchange material on the second composite membrane surface. The first layer of ion exchange material may comprise the recombination catalyst, and the first layer of ion exchange material may be configured to be disposed closer to an anode of an electrolyzer membrane electrode assembly (MEA) than to a cathode. The electrolyzer composite membrane may have at least one further layer of ion exchange material on the first layer of ion exchange material and/or the second layer of ion exchange material. The at least one further layer of ion exchange material present on the first or second composite membrane surface which may be configured to be disposed at or towards an anode side in an electrolyzer device comprises the recombination catalyst.

The composite membrane may have a thickness at 50% relative humidity (RH) of at least about 20 µm. The composite membrane may have a thickness at 50% relative humidity (RH) from about 20 µm to about 250 µm. The composite membrane may have a thickness at 50% relative humidity (RH) from about 20 µm to about 120 µm, or from about 20 µm to about 90 µm, or from about 20 µm to about 80 µm, or from about 20 µm to about 75 µm, or from about 20 µm to about 70 µm, or from about 30 µm to about 60 µm, or from about 20 µm to about 50 µm, or from about 20 µm to about 40 µm, or from about 20 µm to about 30 µm, or from about 25 µm to about 35 µm, or from about 40 µm to about 50 µm, or from about 60 µm to about 120 µm, or from about 60 µm to about 80 µm, or from about 80 µm to about 120 µm, or from about 100 µm to about 120 µm, or from about 30 µm to about 40 µm, or from about 30 µm to about 60 µm, or from about 40 µm to about 60 µm. The composite membrane may have a thickness at 50% RH of about 20 µm, or about 25 µm, or about 30 µm, or about 35 µm, or about 40 µm, or about 45 µm, or about 50 µm, or about 55 µm, or about 60 µm, or about 65 µm, or about 70 µm, or about 75 µm, or about 80 µm, or about 85 µm, or about 90 µm, or about 95 µm, or about 100 µm, or about 105 µm, or about 110 µm, or about 115 µm, or about 120 µm, or about 150 µm, or about 180 µm, or about 200 µm, or about 220 µm, or about 230 µm, or about 250 µm.

Within the context of this disclosure, the total content of the microporous polymer structures within the composite membrane may be presented in terms of total mass of the microporous polymer structures in the composite membrane per the total area of the composite membrane ($g/m^2$). The composite membrane may comprise one or more types of microporous polymer structures. For example, the composite membrane may comprise a single type of microporous polymer structure (e.g. ePTFE membrane) present in at least two reinforcing layers. The composite membrane may comprise at least two reinforcing layers, and each reinforcing layer may comprise a different types of microporous polymer structures (e.g. fluorinated polymers and hydrocarbon polymers). The composite membrane may comprise at least two reinforcing layers and a first of the at least two reinforcing layers may comprise a single type of microporous polymer structure (e.g. ePTFE membrane) and a second of the at least two reinforcing layers may comprise a single type of microporous polymer structure different from the microporous polymer structure of the first of the at least two reinforcing layers (e.g. hydrocarbon polymer).

The total volume of microporous polymer structure in the electrolyzer composite membrane may be at least about 10 vol % based on the total volume of the composite membrane. The total volume of microporous polymer structure in the electrolyzer composite membrane may be at least about 10 vol %, or at least about 15 vol %, or at least about 20 vol 25%, or at least about 25 vol %, or at least about 30 vol %, or at least about 35 vol %, or at least about 40 vol %, or at least about 45 vol %, or at least about 50 vol %, or at least about 55 vol %, or at least about 60 vol %, or at least about 65 vol %, or at least about 70 vol % based on the total volume of the composite membrane.

The total volume of microporous polymer structure in the electrolyzer composite membrane may be t from about 10 vol % to about 80%, or from about 15 vol % to about 80 vol %, or from about 20 vol % to about 80 vol %, or from about 25 vol % to about 80 vol %, or from about 30 vol % to about 80%, from about 40 vol % to about 80%, from about 50 vol % to about 80%, or from about 60 vol % to about 80%, or from about 65 vol % to about 80%, or from about 10 vol % to about 60 vol %, or from about 10 vol % to about 50 vol %, or from about 10 vol % to about 40 vol %, or from about 10 vol % to about 30 vol %, or from about 10 vol % to about 20 vol %, or from about 15 vol % to about 30 vol %, or from about 20 vol % to about 40 vol %, or from about 40 vol % to about 60%, or from about 40 vol % to about 50%, or from about 20 vol % to about 40%, or from about 20 vol % to about 50%, based on the total volume of the composite membrane. The total volume of microporous polymer structures in the electrolyzer composite membrane may be about 10 vol %, or about 15 vol %, or about 20 vol %, or about 25 vol %, or about 30 vol %, or about 35 vol %, or about 40 vol %, or about 45 vol %, or about 50 vol %, or about 55 vol %, or about 60 vol %, or about 65 vol %, or about 70 vol %, or about 80 vol % based on the total volume of the composite membrane.

A composition of the at least two reinforcing layers may be the same. Alternatively, a composition of the at least two reinforcing layers may be different.

The microporous polymer structure may comprise a fluorinated polymer. The microporous polymer structure may comprise one or more fluorinated polymers selected from the group comprising: polytetrafluoroethylene (PTFE), poly (ethylene-co-tetrafluoroethylene) (EPTFE), expanded polytetrafluoroethylene (ePTFE), polyvinylidene fluoride (PVDF), expanded polyvinylidene fluoride (ePVDF), expanded poly(ethylene-co-tetrafluoroethylene) (eEPTFE) or mixtures thereof. Preferably, the fluorinated polymer may be perfluorinated expanded polytetrafluoroethylene (ePTFE).

The microporous polymer structure may comprise a hydrocarbon polymer. The hydrocarbon polymer may comprise polyethylene, polypropylene, polycarbonate, track etched polycarbonate, polystyrene, polysulfone, PES, PEN, or mixtures thereof.

Within the context of this disclosure, the total mass per area of microporous polymer structure in the electrolyzer composite membrane is considered to be the sum of the content of microporous polymer structure in each of the reinforcing layers of the electrolyzer composite membrane. In embodiments in which the microporous polymer structure comprises ePTFE, the total mass per area of the microporous polymer structures in the electrolyzer composite membrane may be at least about 8 $g/m^2$ based on the total area of the composite membrane. The total mass per area of the microporous polymer structure may be at least about 10 $g/m^2$, or at least about 15 $g/m^2$, or at least about 20 $g/m^2$, or at least about 25 $g/m^2$, or at least about 30 $g/m^2$, or about 35 $g/m^2$, or at least about 40 $g/m^2$, or at least about 45 $g/m^2$, or at least about 50 $g/m^2$, or at least about 55 $g/m^2$, or at least about 60 $g/m^2$, or at least about 65 $g/m^2$, or at least about 70 g/m², or at least about 75 g/m² based on the total area of the composite membrane.

In embodiments in which the microporous polymer structure comprises ePTFE, the total mass (in mass per area) of the microporous polymer structure within the electrolyzer composite membrane may be from about 8 g/m² to about 80 g/m², or from about 8 g/m² to about 70 g/m², or from about 8 g/m² to about 60 g/m², or from about 8 g/m² to about 60 g/m², or from about 8 g/m² to about 50 g/m², or from about or from about 8 g/m² to about 40 g/m², or from about 8 g/m² to about 35 g/m², or from about 8 g/m² to about 30 g/m², or from about 8 g/m² to about 20 g/m², or from about 8 g/m² to about 15 g/m² based on the total area of the composite membrane. The total mass per area of the microporous polymer structure may be from about 15 g/m² to about 30 g/m² based on the total area of the composite membrane. The total mass per area of the microporous polymer structure may be from about 10 g/m² to about 15 g/m² based on the total area of the composite membrane. The total content (in mass per area) of the microporous polymer structure within the electrolyzer composite membrane may be from about 10 g/m² to about 18 g/m² based on the total area of the composite membrane. The total mass per area of the microporous polymer structure may be from about 8 g/m² to about 15 g/m² based on the total area of the composite membrane. The total mass per area of the microporous polymer structure may be from about 20 g/m² to about 80 g/m², or from about 30 g/m² to about 70 g/m², or from about 20 g/m² to about 50 g/m², or from about 30 g/m² to about 60 g/m², or from about 15 g/m² to about 40 g/m², or from about 15 g/m² to about 30 g/m², or from about 15 g/m² to about 25 g/m², or from about 20 g/m² to about 40 g/m², or from about 25 g/m² to about 35 g/m², based on the total area of the composite membrane.

In embodiments in which the microporous polymer structure comprises ePTFE, each of the at least two reinforcing layers of the reinforcing structure may have a microporous polymer structure mass of about 5 g/m², or about 5.5 g/m², or about 6 g/m², or about 7 g/m², or about 8 g/m², or about 9 g/m², or about 10 g/m², or about 11 g/m², or about 12 g/m², or about 13 g/m², or about 14 g/m², or about 15 g/m², or about 16 g/m², or about 17 g/m², or about 18 g/m², or about 19 g/m², or about 20 g/m², or about 30 g/m², or about 40 g/m², or about 50 g/m², or about 60 g/m², or about 70 g/m², or about 80 g/m², based on the total area of the composite membrane.

Each of the at least two reinforcing layers of the reinforcing structure may have a microporous polymer structure mass of at least 5 g·m⁻². Each of the at least two reinforcing layers of the reinforcing structure may have a microporous polymer structure content of from about 5 g·m⁻² to about 75 g·m⁻², or from about 10 g/m² to about 60 g/m², or from about 15 g/m² to about 30 g/m², or from about 15 g/m² to about 25 g/m², or from about 20 g/m² to about 40 g/m², or from about 25 g/m² to about 35 g/m², or from about 5 g/m² to about 25 g/m², or from about 5 g/m² to about 10 g/m², or from about 10 g/m² to about 25 g/m², or from about 10 g/m² to about 15 g/m², or from about 15 g/m² to about 30 g/m², or from about 8 g/m² to about 10 g/m², or from about 30 g/m² to about 50 g/m², based on the total area of the composite membrane.

In embodiments in which the microporous polymer structure comprises a hydrocarbon polymer, the total mass per area of the microporous polymer structure may be at least about 2.5 g/m², or at least about 3 g/m², or at least about 4 g/m², or at least about 7 g/m², or at least about 8 g/m², or at least about 9 g/m², or at least about 10 g/m², or at least about 2 g/m², or at least about 15 g/m², or at least about 17 g/m², or at least about 20 g/m², or at least about 23 g/m², or at least about 25 g/m², or at least about 27 g/m², or at least about 30 g/m², or at least about 35 g/m², or at least about 40 g/m², based on the total area of the composite membrane. The total mass per area of the microporous polymer structure may be from about 2.5 g/m² to about 40 g/m², or from about 2.5 g/m² to about 35 g/m², or from about 2.5 g/m² to about 30 g/m², or from about 2.5 g/m² to about 25 g/m², or from about 2.5 g/m² to about 20 g/m², or from about 2.5 g/m² to about 15 g/m², or from about 2.5 g/m² to about 10 g/m², or from about 2.5 g/m² to about 5 g/m², or from about 5 g/m² to about 40 g/m², or from about 10 g/m² to about 40 g/m², or from about 15 g/m² to about 40 g/m², or from about 20 g/m² to about 40 g/m², or from about 25 g/m² to about 40 g/m², or from about 30 g/m² to about 40 g/m², or from about 35 g/m² to about 40 g/m², or from about 10 g/m² to about 30 g/m², or from about 20 g/m² to about 40 g/m², or from about 30 g/m² to about 40 g/m², based on the total area of the composite membrane.

The composite membrane may have an average puncture failure force of at least about 60 gF (0.59 N), when measured according to the Average Puncture Force Failure Test described hereinbelow. For example, the composite membrane may have an average failure force of at least about 60 gF (0.59 N), or at least about 65 gF (0.64 N), or at least about 70 gF (0.69 N), or at least about 75 gF (0.74 N), or at least about 80 gF (0.78 N), or at least about 90 gF (0.88 N), or at least about 100 gF (0.98 N), or at least about 110 gF (1.08 N), or at least about 120 gF (1.18 N), or at least about 130 gF (1.27 N), or at least about 140 gF (1.37 N), or at least about 150 gF (1.47 N), when measured by the Average Puncture Force Failure Test described hereinbelow.

The composite membrane may have an average failure force of from about 60 gF (0.59 N) to about 150 gF (1.47 N), when measured according to the Average Puncture Force Failure Test described hereinbelow, or from about 60 gF (0.59 N) to about 140 gF (1.37 N), or from about 60 gF (0.59 N) to about 130 gF (1.27 N), or from about 60 gF (0.59 N) to about 120 gF (1.18 N), or from about 60 gF (0.59 N) to about 110 gF (1.08 N), or from about 60 gF (0.59 N) to about 100 gF (0.98 N), or from about 60 gF (0.59 N) to about 90 gF (0.88 N), or from about 60 gF (0.59 N) to about 80 gF (0.78 N), or from about 60 gF (0.59 N) to about 75 gF (0.74 N), or from about 60 gF (0.59 N) to about 70 gF (0.69 N), or from about 70 gF (0.69 N) to about 90 gF (0.88 N), or from about 80 gF (0.78 N) to about 90 gF (0.88 N), or from about 65 gF (0.64 N) to about 75 gF (0.74 N), when measured by the Average Puncture Force Failure Test described hereinbelow.

The composite membrane may have an average failure force of about 60 gF (0.59 N), or about 65 gF (0.64 N), or about 70 gF (0.69 N), or about 75 gF (0.74 N), or about 80 gF (0.78 N), or about 85 gF (0.83 N), or about 90 gF (0.88 N), or about 100 gF (0.98 N), or about 110 gF (1.08 N), or about 120 gF (1.18 N), or about 130 gF (1.27 N), about 140 gF (1.37 N), or about 150 gF (1.47 N), when measured by the Average Puncture Force Failure Test described hereinbelow.

The at least two reinforcing layers may be in direct contact. Alternatively, the at least two reinforcing layers may not be in contact with each other. The at least two reinforcing layers may be separated by a distance d. In embodiments in which the at least two reinforcing layers are in direct contact, the distance d may be about 0 μm. The distance d may be from about 0.1 μm to about 20 μm. The distance d may be from about 0.1 μm to about 15 μm. The distanced may be from about 0.1 µm to about 10 µm. The distanced may be from about 10 µm to about 20 µm. The distance d may be from about 10 µm to about 15 µm. The distance d may be from about 15 µm to about 20 µm. The distance d may be from about 2 µm to about 8 µm. The distance d may be from about 2 µm to about 8 µm. The distance d may be from about 2 µm to about 8 µm. The distanced may be from about 2 µm to about 8 µm. The distance d may be from about 2 µm to about 8 µm. The distance d may be from about 0.5 µm to about 10 µm. The distance d may be from about 1 µm to about 10 µm. The distance d may be from about 2 µm to about 8 µm. The distanced may be from about 4 µm to about 6 µm. The distance d may be from about 1 µm to about 5 µm. The distance d may be from about 5 µm to about 10 µm. The distance d may be from about 6 µm to about 8 µm. The distance d may be about 0.1 µm, or about 0.5 µm, or about 1 µm, or about 2 µm, or about 3 µm, or about 4 µm, or about 5 µm, or about 6 µm, or about 7 µm, or about 8 µm, or about 9 µm, or about 10 µm, or about 11 µm, or about 12 µm, or about 13 µm, or about 14 µm, or about 15 µm, or about 16 µm, or about 17 µm, or about 18 µm, or about 19 µm, or about 20 µm.

The at least two reinforcing layers may be separated by at least one internal layer of Ion Exchange Material (IEM). Each of the at least one internal layer of ion exchange material may comprise a single ion exchange material. Each of the at least one internal layer of ion exchange material may comprise a mixture of two or more ion exchange materials. Each of the at least one internal layer of ion exchange material may comprise at least one ionomer. The at least one internal ionomer may comprise a proton conducting polymer. The proton conducting polymer may comprise hydrocarbon ionomer. The proton conducting polymer may comprise perfluorinated ionomer. The proton conducting polymer may comprise perfluorosulfonic acid (PFSA). Each of the at least one internal layer of ion exchange material may be from about 1 µm to about 20 µm thick, for example, about 2 µm or from about 10 to about 12 µm thick.

The at least two reinforcing layers may be separated by one layer of Ion Exchange Material (IEM). The layer of ion exchange material may comprise a single ion exchange material. The layer of ion exchange material may comprise a mixture of more than one ion exchange materials.

The at least two reinforcing layers may be separated by two or more layers of ion exchange material. At least two of the two or more layers of ion exchange material may comprise different ion exchange materials. At least two of the two or more layers of ion exchange material may comprise the same ion exchange materials.

The at least two reinforcing layers may be separated by a layer of Ion Exchange Material (IEM), wherein the ion exchange material comprises more than one layer of ion exchange material, and wherein the layers of ion exchange material disposed between the at least two reinforcing layers are formed of different ion exchange material.

Each of the at least two reinforcing layers may have a first surface and a second surface and at least one or both of the first surface and the second surface of each reinforcing layers may be at least partially impregnated with ion exchange material.

In embodiments in which the composite membrane comprises two reinforcing layers, the first reinforcing layer may comprise a first surface and a second surface, and the second reinforcing layer may comprise a first surface and a second surface. The first surface of the first of the at least two reinforcing layers may be at least partially impregnated with ion exchange material. The second surface of the second of the at least two reinforcing layers may be at least partially impregnated with ion exchange material. Both the first and the second surface of the at least two reinforcing layers may be at least partially impregnated with ion exchange material.

In embodiments in which both the first surface of the first reinforcing layer and the second surface of the second reinforcing layer are at least partially impregnated with ion exchange material, the ion exchange material of the first surface of the first reinforcing layer may be the same or different to the ion exchange material of the second surface of the second reinforcing layer.

The microporous polymer structures may be partially imbibed with the ion exchange material. The microporous polymer structures may be fully imbibed with the ion exchange material. In embodiments in which the composite membrane has two reinforcing layers, the microporous polymer structure of the two reinforcing layers may be fully imbibed with ion exchange material. In addition, the composite membrane may comprise two additional layers of ion exchange material on the first and second surfaces of the composite membrane. In addition, the first and second reinforcing layers may be separated from each other by an internal layer of ion exchange material. The layers of ion exchange material formed the first surface of the composite membrane, the second surface of the composite membrane, and/or arranged between the two reinforcing layers may comprise the same or different ion exchange materials. For example, the ion exchange materials may be ionomers.

The total average equivalent volume of ion exchange material may be from about 240 cc/mol eq to about 1200 cc/mol eq. The average equivalent volume of the ion exchange material may be from about 240 cc/mole eq to about 720 cc/mole eq. The average equivalent volume of the ion exchange material may be from about 350 cc/mole eq to about 475 cc/mole eq. The total average equivalent volume of ion exchange material may comprise the total volume of ion exchange material distributed between all the ion exchange material layers of the composite membrane. The ion exchange material may have a density not lower than about 1.9 g/cc at 0% relative humidity.

The ion exchange material may have a total equivalent weight (EW) from about 370 g/mol eq to about 2000 g/mol eq $SO_3-$. The ion exchange material may have a total equivalent weight (EW) from about 470 g/mol eq to about 1275 g/mol eq $SO_3-$. The ion exchange material may have a total equivalent weight (EW) from about 700 g/mol eq to about 1000 g/mol eq $SO_3-$. The ion exchange material may have an equivalent weight of about 710 g/mol eq $SO_3-$. The ion exchange material may have an equivalent weight of about 810 g/mol eq $SO_3-$. The ion exchange material may have an equivalent weight of about 910 g/mol eq $SO_3-$.

In embodiments in which the composite membrane comprises two reinforcing layers disposed directly in contact, the second surface of the first reinforcing layer and the first surface of the second reinforcing layer may be in direct contact.

In embodiments in which the electrolyzer composite membrane comprises two reinforcing layers disposed separated from each other, the second surface of the first reinforcing layer and the first surface of the second reinforcing layer may be separated by a layer of ion exchange material (i.e. an internal layer of ion exchange material). The at least one internal layer of ion exchange material may not comprise recombination catalyst. In some embodiments in which the electrolyzer composite membrane comprises two reinforcing layers disposed separated from each other, the second surface of the first reinforcing layer and the first surface of the second reinforcing layer may not be separated by a recombination catalyst layer. In embodiments in which the composite membrane comprises three reinforcing layer disposed separated from each other, the first reinforcing layer and the second reinforcing layer may be separated by a first internal layer of ion exchange material, and the second reinforcing layer and the third reinforcing layer may be separated by a second internal layer of ion exchange material.

The electrolyzer composite membrane may comprise a first surface and a second surface. The first surface of the composite membrane may comprise a first ion exchange material. The second surface of the composite membrane may comprise a second ion exchange material. The electrolyzer composite membrane may comprise at least one internal layer of ion exchange material between the at least two reinforcing layers.

In embodiments in which the composite membrane comprises three or more reinforcing layers, all the reinforcing layers may be in direct contact with each other. Alternatively, some of the reinforcing layers may be in direct contact with each other, while some of the reinforcing layers may be separated from each other (e.g. by an internal layer of ion exchange material). Alternatively, all of the reinforcing layers may be separated from each other. In embodiments comprising reinforcing layers which are separated from each other, the reinforcing layers may be separated from each other by ion exchange material. For example, the composite membrane may comprise three or more reinforcing layers, each reinforcing layer separated from the next reinforcing layer by one or more layers of ion exchange material. In addition, the external reinforcing layers may be at least partially impregnated with ion exchange material on their outer surfaces.

The electrolyzer composite membrane may further comprise a backer layer disposed on a first surface of the composite membrane, a second surface of the composite membrane, or both.

The electrolyzer composite membrane may experience a hydrogen crossover of up to about 4%, preferably up to about 2%, and further preferably up to 1% when measured by the hydrogen cross-over detection method described herein at 55° C. and 0.5 A/cm$^2$ at a pressure differential of 2 bar. The electrolyzer composite membrane may experience a hydrogen crossover of from about 0% to about 2%, or from about 0% to about 1%, or from about 0.2% to about 1%, or from about 0.3% to about 1%, or from about 0.3% to about 0.9%, or from about 0.5% to about 1%, or from about 0.5% to about 1.5%, or from about 1% to about 2%, or from about 1.5% to about 2%, or from about 0.6% to about 1.2%, when measured by the hydrogen cross-over detection method described herein.

In a second aspect there is provided an electrolyzer composite membrane electrode assembly for an electrochemical device, comprising:
  at least one electrode; and
  the composite membrane as described hereinabove in contact with the at least one electrode.

The electrolyzer composite membrane may be attached to the at least one electrode. The electrolyzer composite membrane may adhered to the at least one electrode. The electrolyzer composite membrane may be pressed against the at least one electrode. The electrolyzer composite membrane may be fused to the at least one electrode. The at least one electrode may comprise doped carbon fibers.

The electrolyzer composite membrane electrode assembly may comprise a first electrode and a second electrode. The first electrode may form an anode. The second electrode form a cathode. The anode may be in contact with the recombination catalyst of the electrolyzer composite membrane.

The electrolyzer composite membrane may comprise a first and a second electrode layers. Each of the first and second electrode layers may be disposed on an opposite surface of the electrolyzer composite membrane. The anode electrode layer may be disposed adjacent to or next to the surface of the electrolyzer composite membrane which comprises the recombination catalyst.

The electrode may comprise a catalyst or a mixture of catalysts. The electrode may comprise a metal or a metal oxide. The electrode may be dispersed in a support. The electrode (e.g. the cathode and/or the anode) may be a carbon/platinum electrode with ionomer. The electrode may comprise one or more of: an alloy with ionomer/Pt/Co/Pd, doped graphene/MoSx (Cathode); RuO2/IrO2/Ir, Ru bimetallic oxides, Ir/Pt bimetallic oxides, Ti, Sn, Ta, Nb, Sb, Pb, Mn Oxides mixed with Ir or Ru Oxides, and the like. The electrode may comprise a catalyst support selected from carbon (e.g. Carbon Black/CNTs), or carbon nanoparticles doped with N, P, S or B). The catalyst in the electrode or electrodes may be present in a loading of loading in the range of about 0.4-4.0 $mg_{metal}/cm^2$. The cathode may be present at a loading in the range of about 0.1 to 40 mg of precious metal per cm$^2$, for example 0.0-2.0 $mg_{metal}/cm^2$, or about 1.0-2.0 $mg_{metal}/cm^2$, or about 0.2-1.0 $mg_{metal}/cm^2$. The anode may be present at a catalyst loading in the range of about 0.4-4.0 $mg_{metal}/cm^2$, or about 0.5-2.0 $mg_{metal}/cm^2$, or about 0.5-1.5 $mg_{metal}/cm^2$.

The electrode or electrodes may comprise fibers. The electrode or electrodes may be a fibrous electrode. The electrode or electrodes may be doped with fibers. The electrode or electrodes may comprise carbon fibers. The carbon fibers may have a diameter from about μm to about 30 μm. The electrode or electrodes may comprise a porous layer (typical pore size 1-200 micron). The porous layer may comprise, among others, a felt, a paper, or a woven material.

The electrolyzer composite membrane electrode assembly may comprise a fluid diffusion layer. The fluid diffusion layer may be selected from a felt, a paper or a woven material, a carbon/carbon based diffusion layer, titanium porous sintered powder mesh/plate/Fiber/Felt, and the like, a stainless steel mesh, or mixtures thereof. The fluid diffusion layer may comprise any suitable morphology, such as fibers, mats, nonwovens and the like. The fluid diffusion layer may sandwich the electrolyzer composite membrane and electrodes. In other words, the fluid diffusion layer may be disposed behind a or each electrode/electrode layer. In another aspect there is provided an electrolyzer comprising an electrolyzer composite membrane or an electrolyzer composite membrane-electrode assembly as described hereinabove.

In another aspect there is provided a method of manufacturing an electrolyzer composite membrane as described herein. The method comprises the steps of:
  a) coating a backer layer with the first ionomer by providing a backer layer and depositing a liquid layer of a first ionomer
  b) depositing a first reinforcing layer comprising a microporous polymer structure over the liquid layer of the first ionomer and allowing the microporous polymer structure of the first reinforcing layer to become imbibed or at least partially imbibed with the first ionomer;
  c) optionally drying the laminate;

d) coating the imbibed first reinforcing layer with a liquid layer of a second ionomer solution;

e) depositing a second reinforcing layer comprising a microporous polymer structure over the liquid layer of the second ionomer and allowing the microporous polymer structure of the second reinforcing layer to become imbibed or at least partially imbibed with the second ionomer;

f) optionally drying the laminate;

g) optionally coating the outermost surface of the laminate which is furthest away from the backer with a third liquid layer of ionomer and allowing the microporous polymer structure to become at least partially imbibed with ionomer;

h) optionally drying the laminate;

i) depositing a recombination catalyst layer and optionally drying the laminate;

j) optionally depositing a fourth liquid layer of ionomer on the recombination catalyst layer; and k) drying the laminate.

The method may include repeating steps d), e) and f) with further reinforcing layers and liquid layers of ionomer and drying the laminate. For example, for electrolyzer composite membranes comprising three reinforcing layers, a third liquid layer of ionomer solution may be deposited over the imbibed second reinforcing layer and applying a third reinforcing layer over the layer of third liquid layer of ionomer solution, and then the laminate may be dried. In some embodiments, the process may comprise adding even further ionomer and reinforcing layers, and drying the laminate.

The electrolyzer composite membrane may be manufactured by sequential coating and/or lamination of the different components of the membrane. The manufacturing process may comprise drying steps after some or all of the coating or lamination steps. In some embodiments, the manufacturing process may comprise only a single drying step at the end of the process.

In step i), the recombination catalyst may be deposited as a particulate mixed with ionomer to coat the outermost surface of the composite. Some of the recombination catalyst particles may become imbibed within the outermost reinforcing layer. The recombination catalyst may be mixed with ionomer and a support material as described above prior to coating.

In some embodiments, steps g) and h) may be omitted and the recombination catalyst may be deposited directly on the reinforcing layer which is furthest away from the backer. In embodiments in which steps g and h) are present, the composite membrane comprises a layer of ionomer (i.e. unreinforced ionomer) disposed between the recombination catalyst and the reinforcing layer which is furthest away from the backer.

In embodiments in which two reinforcing layers are in contact with each other, the process described above is modified to omit the step of coating the reinforcing layer with another solution of ionomer before applying a further reinforcing layer. For example, in the process described above, step d) would be omitted.

Membrane electrode assemblies may be prepared by depositing an anode on the surface of the electrolyzer composite membrane which has the recombination catalyst and depositing a cathode on the opposite surface of the electrolyzer composite membrane (i.e. the surface which does not have recombination catalyst) after removing the backer. Within the context of this disclosure, depositing an electrode (anode and/or cathode), may comprise any techniques known in the art, such as coating, spraying, laminating, and the like.

In some embodiments, membrane electrode assemblies may be prepared by depositing the cathode on a fluid diffusion layer to form a fluid diffusion electrode composite and depositing the fluid diffusion electrode composite on the surface of the electrolyzer composite membrane which is furthest away from the recombination catalyst. The anode may be deposited on the surface of the electrolyzer composite membrane which is closest to the recombination catalyst, and a fluid diffusion layer is deposited on the anode layer.

The electrodes (i.e. anode and cathode) may be deposited by any suitable techniques known in the art. For example, solid electrode layers be pressed against the electrolyzer composite membrane by any suitable techniques. Alternatively, (liquid) electrode inks may be applied on the electrolyzer composite membrane or a fluid diffusion layer. Upon drying the composite, the solvent of the electrode ink may dry to form a solid electrode layer. In embodiments in which the electrode is deposited on a fluid diffusion layer, the electrolyzer composite membrane may be laminated to the electrode-fluid diffusion composite to form a MEA. For the avoidance of doubt, the backer must be removed from the electrolyzer composite membrane before applying the cathode. The ionomers in the ionomer solutions employed in each of the ionomer layers (a.k.a. buttercoats or BC) may be the same or different. The reinforcing layers employed in the electrolyte composite membrane may be all the same, or at least one of the reinforcing layers may be different The inventors have endeavored to solve the problems of low piercing resistance of state of the art PEMs, as mentioned above. As a consequence, they surprisingly found that increasing the reinforcing microporous polymer structure content in Polymer Electrolyte Membranes (PEMs) continually increases piercing resistance. Surprisingly, this increased reinforcement may be achieved without increasing the thickness of the PEMs or increasing the amount of ionomer employed.

Furthermore, the inventors found that for a given total content of reinforcing microporous polymer structure, providing the microporous polymer structure in a multilayer arrangement (at least two layers) significantly improves the piercing resistance of the Polymer Electrolyte Membranes (PEMs) compared to PEMs with equivalent content of microporous polymer structure provided in a single layer.

Moreover, the inventors have discovered that adding a recombination catalyst adjacent to the anode (e.g. in contact with the anode) minimizes the hydrogen crossover to the anode, thus allowing thin electrolyzer PEMs to be safely used in electrolyzers.

Providing PEMs which are highly resistant to piercing decreases the potential for electrolyzer failure due to shorts occurring if the composite membranes are pierced upon electrolyzer assembly. It also decreases the risk of failure of the electrolyzer due to explosions occurring due to piercing of the PEM and hydrogen crossover to the anode. It may also increase the lifetime of the devices fabricated with said membranes by decreasing the occurrence of shorts. Furthermore, providing membranes that are highly resistant to piercing by other electrolyzer components without increasing the thickness of the membrane enables the ion conductance of the membranes to remain high and reduces the cost of manufacture, given that thin membranes require a lower content of ionomer having a comparable fraction of reinforcement. The increased mechanical resistance of the thin

BRIEF DESCRIPTION OF THE FIGURES

FIG. 10 shows a membrane electrode assembly comprising the electrolyzer composite membrane of FIG. 8, an anode disposed adjacent to the recombination catalyst layer, and a cathode disposed adjacent to the second external bottom layer of ion exchange material.

FIG. 11 shows a schematic representation of the chemical reactions taking place in an electrolyzer and a basic schematic representation of a Membrane Electrode Assembly.

FIG. 15 shows Table 1, presenting the properties of the electrolyzer composite membranes of example electrolyzer composite membranes according to embodiments of the invention, a commercial electrolyzer composite membrane, and two comparative examples. Table 1 also presents piercing resistance and hydrogen crossover data for the examples.

FIG. 16 shows Table 2, presenting the properties of microporous polymer structures used in the electrolyzer composite membranes of the examples.

DETAILED DESCRIPTION

Figure 1:
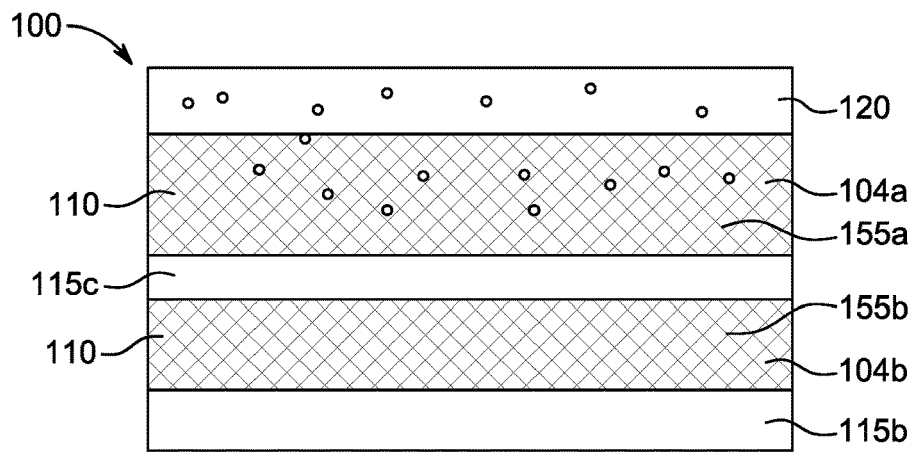
FIG. 1 shows a schematic representation of a cross-section of an electrolyzer composite membrane according to an embodiment of the disclosure. The electrolyzer composite membrane has two reinforcing layers, each comprising a microporous polymer structure separated by an internal layer of ion exchange material and two external layers of ion exchange material, a first external upper layer and a second external bottom layer. The first external upper layer of ion exchange material and the reinforcing layer disposed adjacent to the first external upper layer of ion exchange material comprise a recombination catalyst (depicted by dots) dispersed therethrough. The first external upper layer is configured to be disposed adjacent to an anode in an electrolyzer device.

This application discloses electrolyzer composite membranes for electrolyzer devices with improved average failure force and reduced hydrogen cross-over compared to state of the art composite membranes, which leads to an improved puncture resistance of the composite membrane by other components of the electrolyzer device upon device assembly and longer lifespan of the PEMs. Without wishing to be bound by theory, providing composite membranes with at least two reinforcing layers, each of said at least two reinforcing layers comprising a microporous polymer structure contributes significantly to the improvement in puncture resistance of the composite membrane compared to composite membranes of similar thickness and content of microporous polymer structure provided in a single reinforcing layer. Including a recombination catalyst in the membrane minimizes the hydrogen crossover experienced across the membrane, even in thin membranes at a wide range of working pressures.

In some embodiments there is provided a composite membrane for an electrolyzer device, comprising:
  a) at least two reinforcing layers, each of said at least two reinforcing layers comprising a microporous polymer structure; and
  b) an ion exchange material (IEM) at least partially imbibed within the microporous polymer structures of the at least two reinforcing layers and rendering the microporous polymer structures occlusive; and
  c) a recombination catalyst, wherein the recombination catalyst is configured to be disposed closer to an anode than to a cathode of an electrolyzer composite membrane-electrode assembly (MEA) or electrolyzer.

The composite membrane may have a thickness at 50% RH of at least about 20 μm. The microporous polymer structures may be present in a total amount of at least about 10 vol % based on the total volume of the composite membrane.

The electrolyzer composite membrane thickness may be measured from the surface which, in use is configured to be disposed in contact with the cathode to the surface which, in use, is configured to be disposed in contact with the anode. The location of the recombination catalyst layer within the electrolyzer composite membrane may be defined with reference to the thickness of the membrane and the outermost surfaces of the membrane which are in contact with a cathode and an anode respectively. A portion of the electrolyzer composite membrane which is disposed adjacent to the anode may be disposed in contact with the anode. The recombination catalyst may be disposed in contact with an anode. The electrolyzer composite membrane may have a recombination catalyst (e.g. a recombination catalyst layer) disposed at an outermost surface of the membrane which, in use, is configured to be in contact with an anode without any other intervening layers. Although at least part of the recombination catalyst must be closer to the another than to the cathode in a MEA, the recombination catalyst may also extend into the electrolyzer composite membrane. For example, the recombination catalyst may extend from the outermost surface of the membrane to about half of the thickness of the membrane. The recombination catalyst may be present in the outermost surface of the membrane which is configured to be disposed in contact with an anode and it may be present within about 1% to about 75% of the thickness of the membrane. In some embodiments, the recombination catalyst may be configured to be disposed adjacent to the anode. The recombination catalyst may be configured to be in direct contact with the anode. In other embodiments, the recombination catalyst may be configured to be disposed in indirect contact with the anode (e.g. close to the anode but there may be one or more intervening elements therebetween). In some embodiments, the recombination catalyst may be present in a discrete layer. For example, the recombination catalyst may be mixed with ionomer (and optionally a catalyst support) and be located as a layer on the outermost surface of the electrolyzer composite membrane which, in use, is configured to be in contact with an anode. The recombination catalyst may be dispersed within part of the thickness of the membrane. The recombination catalyst may be imbibed within at least one of the reinforcing layers of the electrolyzer composite membrane.

Embodiments have been described using volume-based values in order to provide a way for meaningful comparison between the composition of composite membranes comprising ionomers and microporous polymer structures of different densities. The total microporous polymer structures may be present in an amount of at least about 10 vol % based on the total volume of the composite membrane.

Various definitions used in the present disclosure are provided below.

As used herein, the terms "ionomer" and "ion exchange material" refer to a cation exchange material, an anion exchange material, or an ion exchange material containing both cation and anion exchange capabilities. Mixtures of ion exchange materials may also be employed. Ion exchange material may be perfluorinated or hydrocarbon-based. Suitable ion exchange materials include, for example, perfluorosulfonic acid polymers, perfluorocarboxylic acid polymers, perfluorophosphonic acid polymers, styrenic ion exchange polymers, fluorostyrenic ion exchange polymers, polyarylether ketone ion exchange polymers, polysulfone ion exchange polymers, bis(fluoroalkylsulfonyl)imides, (fluoroalkylsulfonyl)(fluorosulfonyl)imides, polyvinyl alcohol, polyethylene oxides, divinyl benzene, metal salts with or without a polymer, and mixtures thereof. In exemplary embodiments, the ion exchange material comprises perfluorosulfonic acid (PFSA) polymers made by copolymerization of tetrafluoroethylene and perfluorosulfonyl vinyl ester with conversion into proton form.

As used herein, the "equivalent weight" of an ionomer or ion exchange material refers to the weight of polymer (in molecular mass) in the ionomer per sulfonic acid group. Thus, a lower equivalent weight indicates a greater acid content. The equivalent weight (EW) of the ionomer refers to the EW if that ionomer were in its proton form at 0% RH with negligible impurities. The term "ion exchange capacity" refers to the inverse of equivalent weight (1/EW).

As used herein, the "equivalent volume" of an ionomer or ion exchange material refers to the volume of the ionomer per sulfonic acid group. The equivalent volume (EV) of the ionomer refers to the EV if that ionomer were pure and in its proton form at 0% RH, with negligible impurities.

As used herein, the term "microporous polymer structure" refers to a polymeric matrix that supports the ion exchange material, adding structural integrity and durability to the resulting composite membrane. In some exemplary embodiments, the microporous polymer structure comprises expanded polytetrafluoroethylene (ePTFE) having a node and fibril structure. In other exemplary embodiments, the microporous polymer structure comprises track etched polycarbonate membranes having smooth flat surfaces, high apparent density, and well defined pore sizes. The microporous polymer structure is distributed between at least two (i.e. two or more) reinforcing layers. In other words, the electrolyzer composite membranes of the present disclosure comprise a microporous polymer structure present in two or more reinforcing layers.

As used herein, an interior volume of a microporous polymer structure is referred to as "substantially occluded" when said interior volume has structures that is characterized by low volume of voids, less than 10% by volume, and being highly impermeable to gases with Gurley numbers larger than 10000 s. Conversely, interior volume of microporous polymer structure is referred to as "non-occluded" when said interior volume has structures that is characterized by large volume of voids, more than 10% by volume, and being permeable to gases with Gurley numbers less than 10000 s.

Composite Membranes

FIGS. 1 to 9 show schematic representations of electrolyzer composite membranes according to embodiments of the disclosure. Like features to the membrane of FIG. 1 are denoted by the same reference numbers increased by 100 to match the Figure number. FIGS. 1, 2, 3, 4, and 5, show schematic representations of composite membranes 100, 200, 300, 400, 500, comprising an exchange material (e.g. ionomer) 110, 210, 310, 410, 510, and two reinforcing layers 105a,b, 205a,b, 305a,b, 405a,b, 505a,b which have microporous polymer structures. Each of the microporous polymer structures of the reinforcing layers 105a,b, 205a,b, 305a,b, 405a,b, 505a,b, and 605a,b is impregnated (imbibed) with the ion exchange material 110, 210a,b, 310, 410, 510, 610, thus forming occlusive reinforcing layers 104a,b, 204a,b, 304a,b, 404a,b, and 504a,b. In other words, the ion exchange material 110, 210, 310, 410, 510, 610 may substantially impregnate the microporous polymer structure of the reinforcing layers so as to render the interior volume substantially occlusive (i.e. the interior volume having structures that is characterized by low volume of voids and being highly impermeable to gases). For example, by filling greater than 90% of the interior volume of the microporous polymer structure of the reinforcing layers 105a,b, 205a,b, 305a,b, 405a,b, and 05a,b with the ion exchange material 110, 210, 310, 410, 510, 610 substantial occlusion will occur, and membrane will be characterized by Gurley numbers larger than 10000 s. In embodiments according to FIGS. 1, 2 and 3-2, the ion exchange material 110, 210, 310 is disposed on the internal and external surfaces of each of the reinforcing layers, forming (unreinforced) ion exchange material layers 115, 215. In those embodiments, the ion exchange material, in addition to being impregnated in the microporous polymer structures of the two reinforcing layers, is also present in one or more additional ion exchange layers (i.e. unreinforced ionomer or ion exchange material (IEM) layers) 115a,c, 215a,c, 315a, b,c, 415, 515a,b disposed on one or more surfaces of the imbibed reinforcing layers. In all of these embodiments, the different IEM layers within a given membrane may comprise the same ion exchange material as the imbibed layers 104a and 104b, 204a, 204b, 304a, 304b. Alternatively, the ion exchange material of one or both IEM layers (e.g. 115a and/or 115b and/or 115c) may be different to that of the imbibed layers 104a and 104b. The ion exchange material of both IEM layers 115a and 115b may be the same or different. In FIG. 1, the electrolyzer composite membrane 100 has an external IEM layer 115b, which is configured to be disposed adjacent to a cathode in a membrane electrode assembly (MEA). In this embodiment, there is also an internal IEM layer 115c disposed between the two reinforcing layers 155a and 155b. The membrane 100 also has a recombination catalyst 120 disposed on an outermost surface of the membrane which is furthest away from IEM layer 115b. The recombination catalyst 120 partially penetrates within the first reinforcing layer 155a, as represented by discrete dots. The recombination catalyst may be mixed with ion exchange material, present in particulate form, and/or comprise a support.

Figure 2:
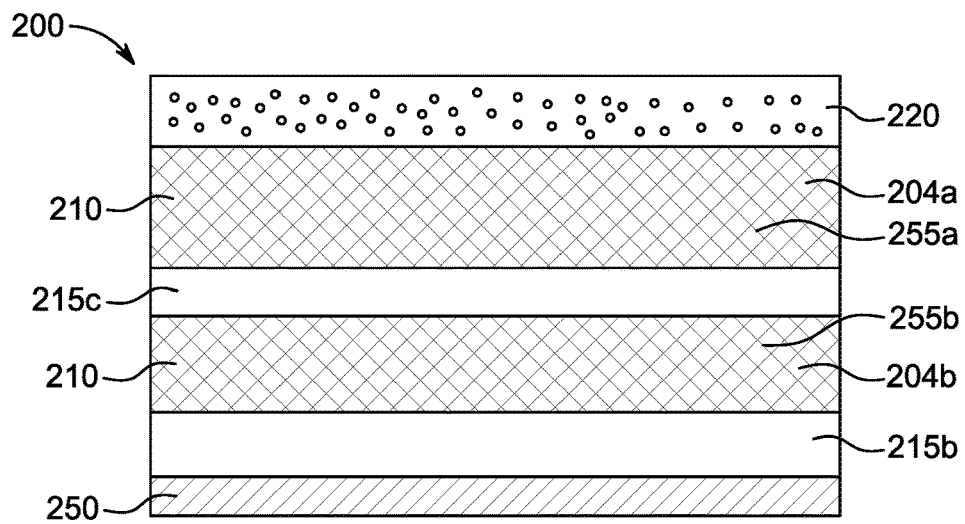
FIG. 2 shows a schematic representation of a cross-section of an electrolyzer composite membrane according to another embodiment of the disclosure. The electrolyzer composite membrane is similar to the electrolyzer composite membrane of FIG. 1, having two reinforcing layers each comprising a microporous polymer structure separated by an internal layer of ion exchange material, and two external layers of ion exchange material, a first external upper layer and a second external bottom layer. The first external upper layer comprises a recombination catalyst (depicted by dots) forming a recombination catalyst layer. The recombination catalyst layer is configured to be disposed next to an anode in an electrolyzer device. In this figure, the electrolyzer composite membrane is shown with a backer layer disposed on the second external bottom layer of ion exchange material.

The membrane 200 of FIG. 2 has a similar construction to the membrane 100 of FIG. 1, but in this case the recombination catalyst is present as a discrete layer 220 of recombination catalyst (e.g. mixed with ionomer and optionally also including a support, such as carbon black), and disposed over the imbibed reinforcing layer 204a. Therefore, no recombination catalyst particles become imbibed within the microporous polymer structures of the reinforcing layers.

Figure 3:
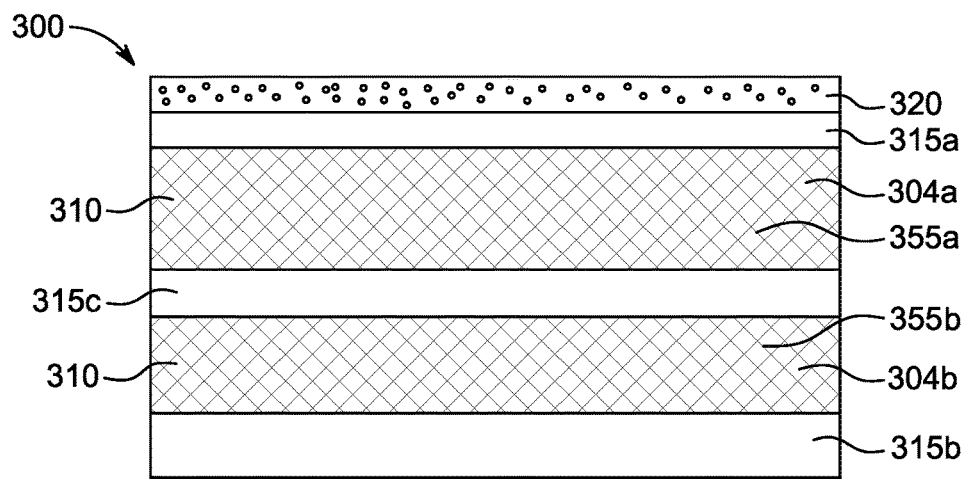
FIG. 3 shows a schematic representation of a cross-section of an electrolyzer composite membrane according to another embodiment of the disclosure. The electrolyzer composite membrane is similar to the composite membrane of FIG. 2, having two reinforcing layers each comprising a microporous polymer structure separated by an internal layer of ion exchange material, and two external layers of ion exchange material, a first external upper layer and a second external bottom layer. The composite membrane comprises a further layer of recombination catalyst over the first external upper layer of ion exchange material. The recombination catalyst layer is configured to be disposed next to an anode in an electrolyzer device.

The membrane 300 of FIG. 3 has a similar construction to the membrane 200 of FIG. 2, with the recombination catalyst present in a discrete layer 220, which is the outermost surface of the membrane which, in use, is configured to be disposed adjacent to or in contact with the anode in a MEA. However, in this embodiment there is an additional IEM layer 315a disposed between the recombination catalyst layer 320 and the first imbibed reinforcing layer 304a.

Figure 4:
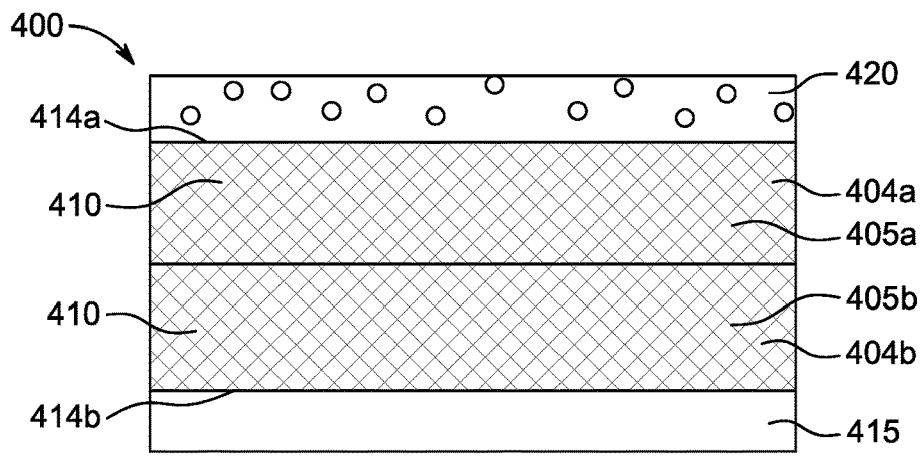
FIG. 4 shows a schematic representation of a cross-section of an electrolyzer composite membrane according to another embodiment of the disclosure. The electrolyzer composite membrane is similar to the composite membrane of FIG. 2, having two reinforcing layers each comprising a microporous polymer structure, but in this embodiment the reinforcing layers are in contact with each other without any internal layer of ion exchange material. The electrolyzer composite membrane comprises two external layers of ion exchange material, a first external upper layer and a second external bottom layer. The first external upper layer comprises a recombination catalyst (depicted by dots). The recombination catalyst layer is configured to be disposed next to an anode in an electrolyzer device.
Figure 5:
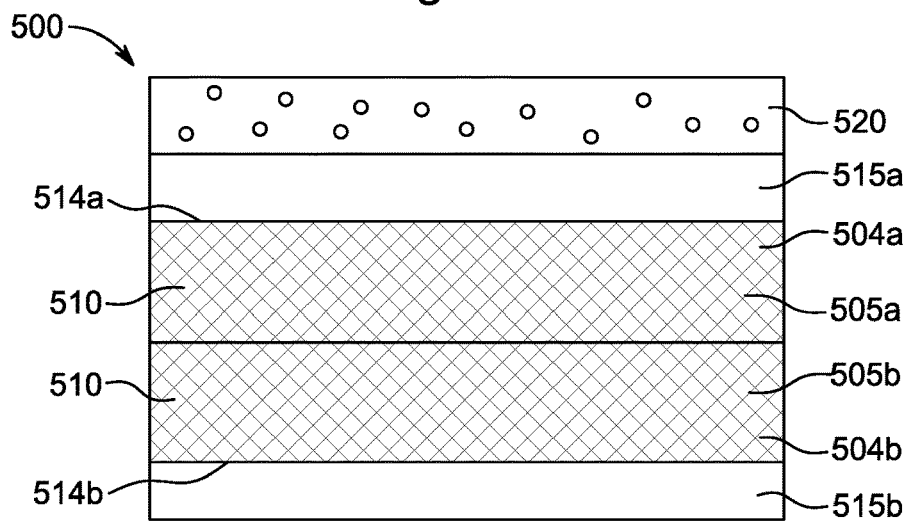
FIG. 5 shows a representation of a cross-section of an electrolyzer composite membrane according to another embodiment of the disclosure. The electrolyzer composite membrane is similar to the composite membrane of FIG. 3, having two reinforcing layers each comprising a microporous polymer structure, but in this case the reinforcing layers are in contact with each other and without any internal layer of ion exchange material. The electrolyzer composite membrane comprises two external layers of ion exchange material, a first external upper layer and a second external bottom layer. The composite membrane comprises a further layer of recombination catalyst over the first external upper layer of ion exchange material. The recombination catalyst layer is configured to be disposed next to an anode in an electrolyzer device. In this figure, the electrolyzer composite membrane is shown with a backer layer disposed on the second external bottom layer of ion exchange material.

The electrolyzer composite membrane 400 of FIG. 4 has a similar construction to the electrolyzer composite membrane 200 of FIG. 2 except that the two imbibed reinforcing layers 404a and 404b are in direct contact without an intervening IEM layer. Similarly, the electrolyzer composite membrane 500 of FIG. 5 has a similar construction to the electrolyzer composite membrane 300 of FIG. 3 except that the two imbibed reinforcing layers 504a and 504b are in direct contact without an intervening IEM layer.

Figure 6:
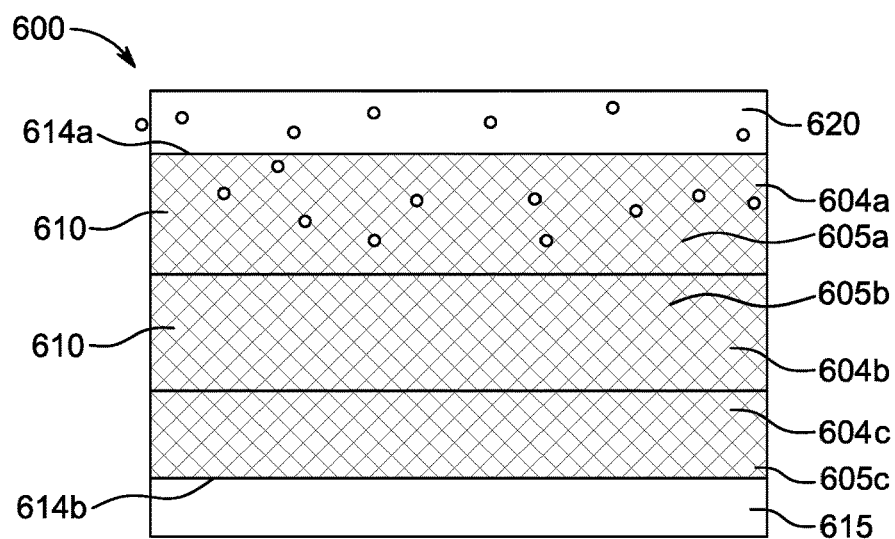
FIG. 6 shows a schematic representation of a cross-section of an electrolyzer composite membrane according to another embodiment of the disclosure. In this embodiment the electrolyzer composite membrane has three reinforcing layers comprising a microporous polymer structure impregnated with an ion exchange material. All three reinforcing layers are in direct contact with each other and the electrolyzer composite membrane has two externa layers of ion exchange material disposed on opposite external surfaces of the reinforcing layers. The first external upper layer of ion exchange material and the reinforcing layer disposed adjacent to the first external upper layer of ion exchange material comprise a recombination catalyst dispersed therethrough. The first external upper layer is configured to be disposed adjacent to an anode in an electrolyzer device.

FIGS. 6 to 9 show electrolyzer composite membranes having three reinforcing layers. FIG. 6 shows an electrolyzer composite membrane 600 having a similar construction to membrane 400 of FIG. 4 but, in this case, there are three imbibed reinforcing layers 604a,b, and c which are in contact with each other without intervening IEM layers. A first external upper layer of ion exchange material and the reinforcing layer disposed adjacent to the first external upper layer of ion exchange material comprise a recombination catalyst dispersed therethrough. The outer external upper layer comprising recombination catalyst is configured to be disposed adjacent to or in contact with the anode in a MEA or electrolyzer, and some of the recombination catalyst becomes imbibed in reinforcing layer 605a.

Figure 7:
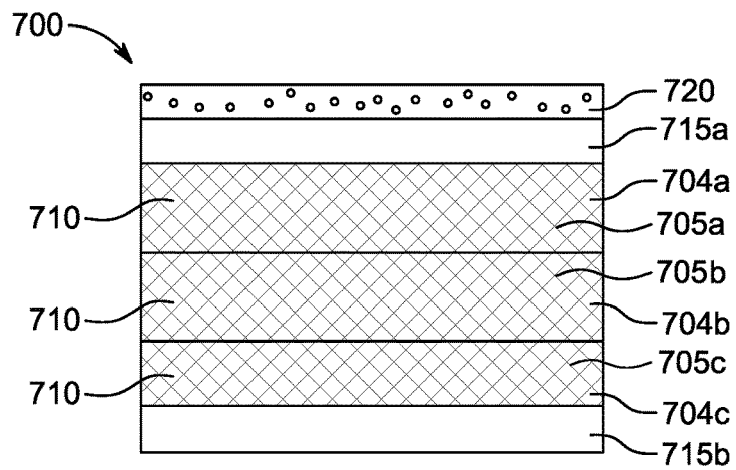
FIG. 7 shows a schematic representation of a cross-section of an electrolyzer composite membrane according to another embodiment of the disclosure. This composite membrane is similar to the membrane of FIG. 6 but the first, upper external layer of ion exchange material does not have recombination catalyst, and the recombination catalyst is present as an additional layer disposed over the first upper external layer of ion exchange material.

FIG. 7 shows an electrolyzer composite membrane 700 having a similar construction to membrane 300 of FIG. 3 but, in this case, there are three imbibed reinforcing layers 704a,b, and c which are in contact with each other without intervening IEM layers.

Figure 8:
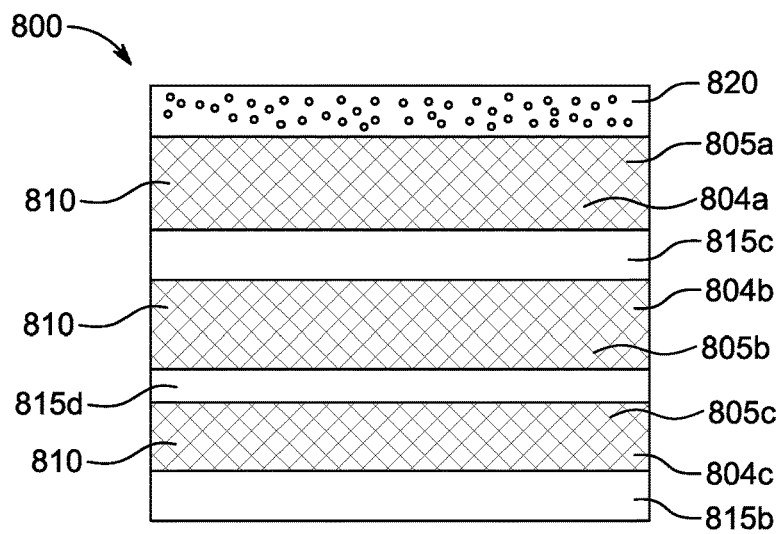
FIG. 8 shows a schematic representation of a cross-section of an electrolyzer composite membrane according to another embodiment of the disclosure. In this embodiment the electrolyzer composite membrane has three reinforcing layers each comprising a microporous polymer structure impregnated with an ion exchange material. The reinforcing layers separated from each other by internal layers of ion exchange material. The electrolyzer composite membrane has two external layers of ion exchange material on opposite externa surfaces of the reinforcing layers. The first external upper layer comprises a recombination catalyst (depicted by dots) forming a recombination catalyst layer. The recombination catalyst layer is configured to be disposed adjacent to an anode in an electrolyzer device.

FIG. 8 shows an electrolyzer composite membrane 800 having a similar construction to membrane 200 of FIG. 2 but, in this case, there are three imbibed reinforcing layers 704a,b, and c which are separated from each other by intervening (internal) IEM layers 815c and 815d respectively.

Figure 9:
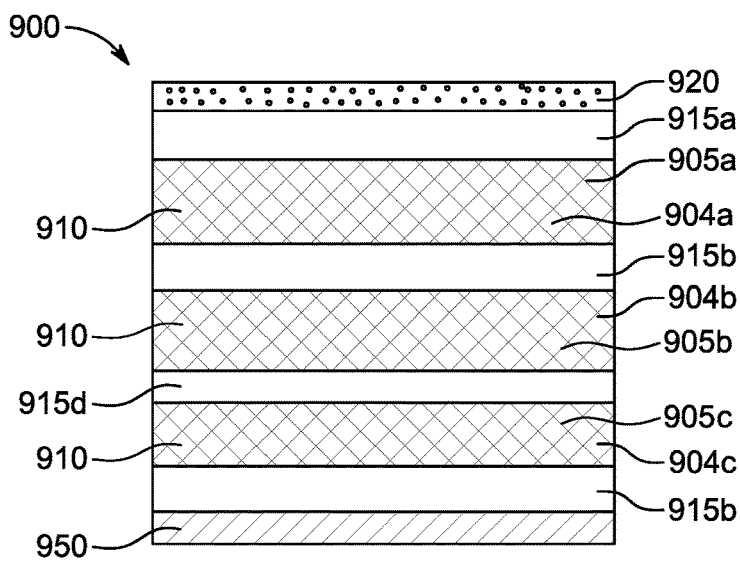
FIG. 9 shows a schematic representation of a cross-section of an electrolyzer composite membrane according to another embodiment of the disclosure. The composite membrane is similar to the composite membrane of FIG. 5, having three reinforcing layers each comprising a microporous polymer structure impregnated with ion exchange material, and the reinforcing layers separated from each other by respective internal layers of ion exchange material. The electrolyzer composite membrane further comprises two externa layers of ion exchange material, a first external upper layer and a second external bottom layer. The composite membrane comprises a further layer of recombination catalyst over the first external upper layer of ion exchange material. The recombination catalyst layer is configured to be disposed adjacent (i.e. next to) an anode in an electrolyzer device. In this figure, the electrolyzer composite membrane is shown with a backer layer disposed on the second external bottom layer of ion exchange material.

FIG. 9 shows an electrolyzer composite membrane 900 having a similar construction to membrane 300 of FIG. 3 but, in this case, there are three imbibed reinforcing layers 804a,b, and c which are separated from each other by intervening (internal) IEM layers 915c and 915d respectively. The membrane 900 also has two external IEM layers 915a (which is configured to face towards the anode) and 915d (which is configured to be disposed adjacent to or in contact with a cathode). As in membrane 300, there is a discrete layer of recombination catalyst 920 disposed on IEM layer 915a. The recombination catalyst layer 920 is configured to be disposed adjacent to or in contact with an anode in a MEA or electrolyzer device.

Although only shown in FIG. 2 and FIG. 9, in all embodiments, the electrolyzer composite membrane may be provided on a backer layer 250, 950. The backer layer 250, 950 may include a release film such as, for example, cycloolefin copolymer (COC) layer. In some embodiments, the electrolyzer composite membrane may be released (or otherwise uncoupled) from the backer layer 250, 950 prior to being incorporated in a membrane electrode assembly (MEA).

Although not specifically shown, other embodiments of composite membranes as described herein may comprise three or more imbibed layers each comprising a reinforcing layer comprising a microporous polymer structure and an ion exchange material imbibed or partially imbibed within the microporous polymer material. In some embodiments, the composite membrane may have only one external IEM layer in one of the external surfaces of the composite membrane. In some embodiments, the composite membrane may have IEM layers on both external surfaces of the imbibed layers and also one or more internal IEM layers between at least two of the imbibed layers. In some embodiments, the composite membrane may have internal IEM layers between each of the imbibed layers. In some embodiments, the composite membrane may have internal IEM layers between each of the imbibed layers and a single external IEM layer on one of the external surfaces of the composite membrane. In some embodiments, the composite membrane may have internal IEM layers between each of the imbibed layers and a single external IEM layer on both of the external surfaces of the composite membrane. In all cases, a recombination catalyst (mixed with an ionomer, and optionally also mixed with a support, such as carbon black) must be disposed closer to an anode than to a cathode in a MEA or electrolyzer device. In some embodiments, the recombination catalyst is disposed in direct or indirect contact with the anode.

The imbibed layers of the composite membrane may be constructed with reinforced layers comprising two (or more) different microporous polymer structures. For example, with reference to FIG. 1, the first imbibed layer 104a may be formed by imbibing a first microporous polymer structure 105a with the ion exchange material 110, and the second imbibed layer 104b may be formed by imbibing a second reinforcing 105b layer comprising a second microporous polymer structure with the same ion exchange material 110. In these embodiments, the first reinforcing layer 105a and the second reinforcing layer 105b are different (e.g. different porosity, different node and fibril structure, different thickness, or the like). The principle of employing different types of reinforcing layers in the composite membrane architecture may be applied to embodiments according to any of the Figures. For example, in embodiments according to FIG. 2, the first imbibed layer 204a may be formed by imbibing a first reinforcing layer 205a comprising a first microporous polymer structure with a first ion exchange material 210a, and the second imbibed layer 204b may be formed by imbibing a second reinforcing layer 205b comprising a second microporous polymer structure 205b with a second ion exchange material 210b. In these embodiments, the first reinforcing layer 205a and the second reinforcing layer 205b are different. Therefore, in the composite membranes described herein and shown in the Figures, the first microporous polymer structure may be the same as or different from the second microporous polymer structure. The first ion exchange material may be the same as or different from the second ion exchange material.

In embodiments in which the composite membrane comprises internal IEM layers between at least two of the reinforcing layers (Figures), the at least two reinforcing layers may be separated by a distance d. The distance d may be from about 1 µm to about 12 µm. The distance d may be from about 2 µm to about 8 µm. The distance d may be from about 4 µm to about 6 µm. The distance d may be from about 1 µm to about 5 µm. The distance d may be from about 5 µm to about 10 µm. The distance d may be from about 6 µm to about 8 µm. The distance d may be about 1 µm, or about 2 µm, or about 3 µm, or about 4 µm, or about 5 µm, or about 6 µm, or about 7 µm, or about 8 µm, or about 9 µm, or about 10 µm. The distance d may be the thickness of the internal IEM layer (i.e. the layer of unreinforced ion exchange material disposed between two contiguous reinforcing layers).

FIG. 10 shows an electrolyzer membrane electrode assembly 1100 according to embodiments of the disclosure. The MEA 1100 has an electrolyzer composite membrane 800 as in FIG. 8, an anode 1110 disposed in contact with a recombination catalyst layer 820 of the membrane 800, and a cathode 1120 disposed in contact with the outer surface of the membrane (external IEM 915b) which is furthest away from the recombination catalyst 820.

FIG. 11 shows a schematic representation of the electrochemical reactions taking place in an electrolyzer. At the anode, water is oxidized to form molecular oxygen and protons. The protons generated at the anode are able to permeate through the electrolyzer composite membrane towards the cathode, where they are reduced to molecular hydrogen.

Figure 12:
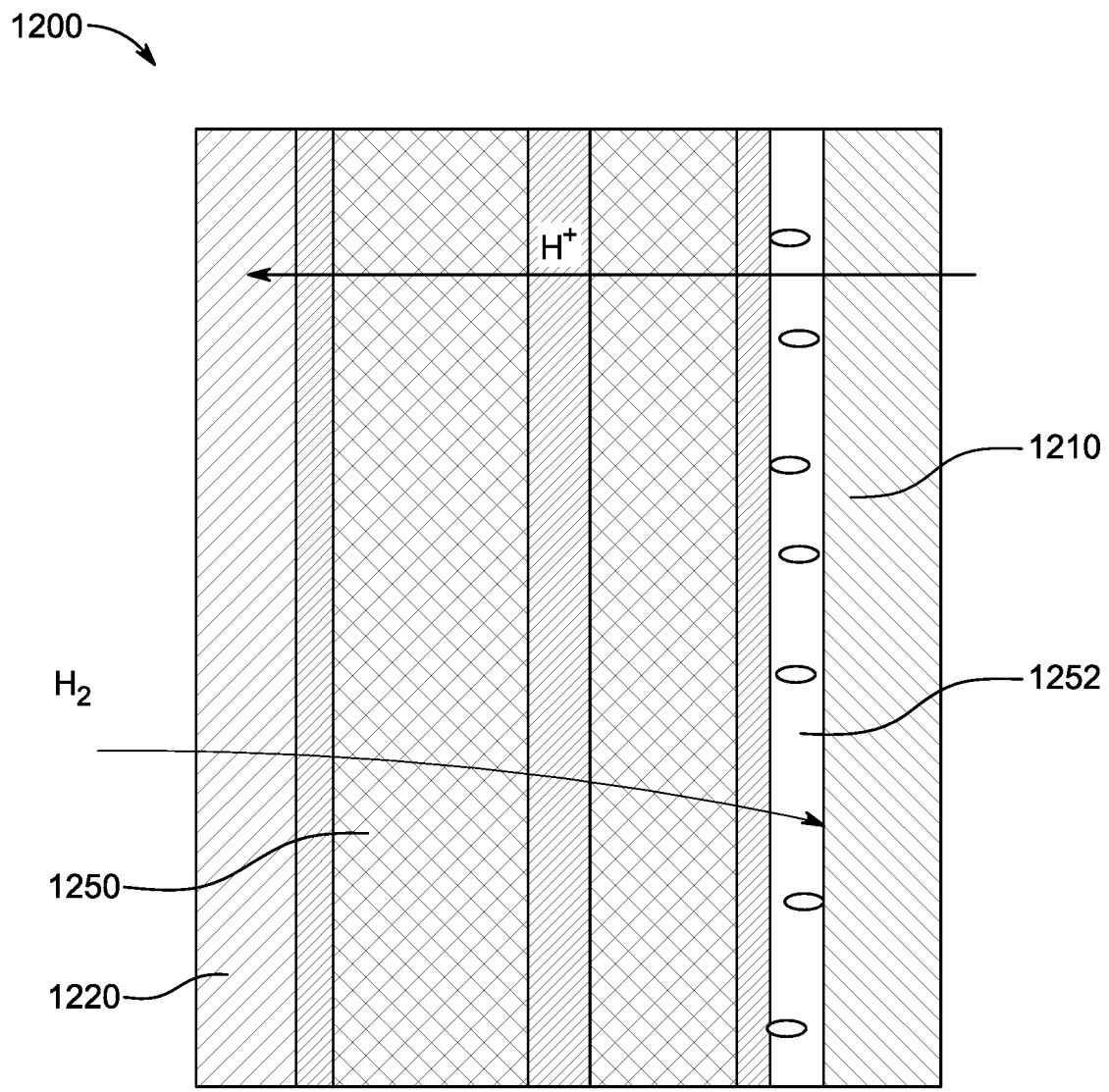
FIG. 12 shows a schematic representation of a membrane electrode assembly (MEA) comprising an electrolyzer composite membrane similar to FIG. 2, having two reinforcing layers separated by an internal layer of ion exchange material, two external layers of ion exchange material and a recombination catalyst layer disposed on one of the external layers of ion exchange material and next to the anode, and a cathode disposed on the other of the external layers of ion exchange material. The flow of hydrogen cations and hydrogen gas across the membrane is depicted in this figure.

FIG. 12 is a schematic representation of the cross-over taking place across an electrolyzer composite membrane electrode assembly (electrolyzer MEA) 1200 comprising an electrolyzer composite membrane 1250 similar to membrane 200 of FIG. 2, an anode 1210 disposed in contact with a recombination catalyst layer 1252 of the membrane 1250, and a cathode 1220 disposed in contact with the outer surface of the membrane 1250 which is furthest away from the recombination catalyst layer 1252. Although the molecular hydrogen should not migrate thorough the electrolyte composite membrane, there may be a small proportion which manages to cross over from the anode to the cathode. The degree of crossover hydrogen needs to be minimized and the inventors have surprisingly discovered that disposing a recombination catalyst 1252 closer to the anode 1210 than to the cathode 1220, the membrane 1250 enables to keep the electrolyzer composite membranes as thin as possible (e.g. a thickness at 50% RH of from about 20 µm to about to 250 µm). Even a low loading of recombination catalyst of less than about 0.01 g(metal)/cm² is enough to catalyze the oxidation of molecular hydrogen back to protons, thus minimizing the risk of explosion at the anode.

Microporous Polymer Structure

The composite membrane may have at least two reinforcing layers, each comprising a microporous polymer structure.

The composite membrane may have two or more reinforcing layers comprising a microporous polymer structure. For example, the composite membrane may have 2, 3, 4, 5, 6 7, 8, 9 or 10 reinforcing layers, each reinforcing layer comprising a microporous polymer structure.

A suitable microporous polymer structure depends largely on the application in which the composite membrane is to be used. The microporous polymer structure preferably has good mechanical properties, is chemically and thermally stable in the environment in which the composite membrane is to be used and is tolerant of any additives used with the ion exchange material for impregnation.

As used herein, the term "reinforcing layer comprising a microporous polymer structure" is intended to refer to a layer having a thickness of at least about 10 µm, optionally from about 10 µm to about 230 µm, or from about 10 µm to about 100 µm, or from about 10 µm to about 50 µm, and having an average micropore size from about 0.05 µm to about 20 µm, e.g., from 0.1 µm to 1 µm. According to various optional embodiments, the pores may have an average pore size from 0.01 to 100 microns, e.g., from 0.05 to 20 microns or from 0.1 to 1 microns. A suitable microporous polymer structure of the reinforcing layers for electrolyzer applications may include porous polymeric materials. The porous polymeric materials may include fluoropolymers, chlorinated polymers, hydrocarbons, polyamides, polycarbonates, polyacrylates, polysulfones, copolyether esters, polyethylene, polypropylene, polyvinylidene fluoride, polyaryl ether ketones, polybenzimidazoles, poly(ethylene-co-tetrafluoroethylene), poly(tetrafluoroethylene-co-hexafluoropropylene). In some embodiments, the microporous polymer structure 105, 205, 305, 405, 505, 6605, 705 includes a perfluorinated porous polymeric material. The perfluorinated porous polymeric material may include polytetrafluoroethylene (PTFE), expanded polytetrafluoroethylene (ePTFE), polyvinylidene fluoride (PVDF), expanded polyvinylidene fluoride (ePVDF), expanded poly(ethylene-co-tetrafluoroethylene) (eEPTFE) or mixtures thereof.

In some embodiments, the microporous polymer structure includes a hydrocarbon material. The hydrocarbon material may include polyethylene, expanded polyethylene, polypropylene, expanded polypropylene, polystyrene, polycarbonate, track etched polycarbonate or mixtures thereof. Examples of suitable perfluorinated porous polymeric materials for use in electrochemical applications include ePTFE made in accordance with the teachings of U.S. Pat. No. 8,757,395, which is incorporated herein by reference in its entirety, and commercially available in a variety of forms from W. L. Gore & Associates, Inc., of Elkton, Md.

In embodiments in which the microporous polymer structure comprises ePTFE, the total mass (in mass per area) of the microporous polymer structure within the electrolyzer composite membrane may be from about 8 g/m² to about 80 g/m², or from about 8 g/m² to about 70 g/m², or from about 8 g/m² to about 60 g/m², or from about 8 g/m² to about 60 g/m², or from about 8 g/m² to about 50 g/m², or from about or from about 8 g/m² to about 40 g/m², or from about 8 g/m² to about 35 g/m², or from about 8 g/m² to about 30 g/m², or from about 8 g/m² to about 20 g/m², or from about 8 g/m² to about 15 g/m² based on the total area of the composite membrane. The total mass per area of the microporous polymer structure may be from about 8 g/m² to about 30 g/m² based on the total area of the composite membrane. The total mass per area of the microporous polymer structure may be from about 10 g/m² to about 15 g/m² based on the total area of the composite membrane. The total content (in mass per area) of the microporous polymer structure within the electrolyzer composite membrane may be from about 20 g/m² to about 80 g/m², or from about 30 g/m² to about 70 g/m², or from about 20 g/m² to about 50 g/m², or from about 30 g/m² to about 60 g/m², based on the total area of the composite membrane.

Ion Exchange Material

A suitable ion exchange material may be dependent on the application in which the composite membrane is to be used. The ion exchange material preferably has an average equivalent volume from about 240 cc/mole eq to about 870 cc/mole eq, optionally from about 240 cc/mole eq to about 650 cc/mole eq, optionally from about 350 cc/mole eq to about 475 cc/mole eq, and is chemically and thermally stable in the environment in which the composite membrane is to be used. A suitable ionomer for fuel cell applications may include an ion exchange material such as a cation exchange material, an anion exchange material, or an ion exchange material containing both cation and anion exchange capabilities. In some embodiments, the ion exchange material comprises a proton conducting polymer or cation exchange material. The ion exchange material may perfluorocarboxylic acid polymers, perfluorophosphonic acid polymers, styrenic ion exchange polymers, fluorostyrenic ion exchange polymers, polyarylether ketone ion exchange polymers, polysulfone ion exchange polymers, bis(fluoroalkylsulfonyl)imides, (fluoroalkylsulfonyl)(fluorosulfonyl)imides, polyvinyl alcohol, polyethylene oxides, divinyl benzene, metal salts with or without a polymer and mixtures thereof. Examples of suitable perfluorosulfonic acid polymers for use in fuel cell applications include Nafion™ (E.I. DuPont de Nemours, Inc., Wilmington, Del., US), Flemion® (Asahi Glass Co. Ltd., Tokyo, JP), Aciplex® (Asahi Chemical Co. Ltd., Tokyo, JP), Aquivion® (SolvaySolexis S.P.A, Italy), and 3M™ (3M Innovative Properties Company, USA) which are commercially available perfluorosulfonic acid copolymers. Other examples of suitable perfluorosulfonic acid polymers for use in fuel cell applications include perfluorinated sulfonyl (co)polymers such as those described in U.S. Pat. No. 5,463,005.

Properties of the Composite Membrane

As discussed above, the composite membrane comprises microporous polymer structures and ion exchange material imbibed into the microporous polymer structures thereby forming two distinct materials that achieve improved piercing resistance of the composite membrane. Without wishing to be bound by theory, the piercing resistance of the composite membrane may be influenced by the distribution of the total content of the microporous polymer structures in multiple (i.e. at least two) reinforcing layers compared to the same content of microporous polymer structure provided in a single reinforcing layer within the architecture of the composite membrane. Furthermore, the piercing resistance of the composite membranes may be influenced by the total content of microporous polymer structure within the composite membrane.

The composite membrane may have a thickness at 50% RH of at least about 20 µm, for example from about 20 µm to about 250 µm, or from about 120 µm to about 250 µm, preferably from about 20 µm to about 120 µm, or from about 20 µm to about 110 µm, or from about 20 µm to about 100 µm, or from about 20 µm to about 90 µm, or from about 20 µm to about 80 µm, or from about 20 µm to about 70 µm, or from about 20 µm to about 60 µm, or from about 20 µm to about 50 µm, or from about 20 µm to about 40 µm, of from about 20 µm to about 30 µm, or from about 25 µm to about 30 µm, or from about 30 µm to about 55 µm, or from about 30 µm to about 45 µm, or from about 30 µm to about 35 µm, or from about 40 µm to about 60 µm, or from about 45 µm to about 55 µm, or from about 50 µm to about 60 µm, or from about 50 µm to about 120 µm, or from about 60 µm to about 120 µm, or from about 70 µm to about 100 µm, or from about 80 µm to about 100 µm, or from about 90 µm to about 120 µm, or from about 100 µm to about 120 µm. The composite membrane may have a thickness at 50% RH of about 20 µm, or about 25 µm, or about 30 µm, or about 35 µm, or about 40 µm, or about 45 µm, or about 50 µm, or about 55 µm, or about 60 µm, or about 65 µm, or about 70 µm, or about 75 µm or about 80 µm, or about 85 µm, or about 90 µm, or about 95 µm, or about 100 µm, or about 105 µm, or about 110 µm, or about 120 µm, or about 150 µm, or about 200 µm, or about 220 µm, or about 250 µm.

The total content of microporous polymer structure (i.e. the sum of the volume of microporous polymer structure occupied by each reinforcing layers in the reinforcing structure) occupies at least about 10 vol % based on the total volume of the composite membrane. For example, the total volume of microporous polymer structure in the composite membrane may be from about 10 vol % to about 80 vol % based on the total volume of the composite membrane, or from about 20 vol % to about 80%, or from about 30 vol % to about 80%, or from about 40 vol % to about 80%, or from about 50 vol % to about 80%, or from about 65 vol % to about 80%, or from about 25 vol % to about 60% or from about 20 vol % to about 50%, or from about 20 vol % to about 40%, or from about 20 vol % to about 30%, or from about 40 vol % to about 60%, or from about 40 vol % to about 50% based on the total volume of the composite membrane. The microporous polymer structure may be present in a total amount of about 10 vol %, or 15 vol %, or about 20 vol %, or about 25 vol %, or about 30 vol %, or about 35 vol %, or about 40 vol %, or about 45 vol %, or about 50 vol %, or about 55 vol %, or about 60 vol %, or about 65 vol %, or about 70 vol %, or about 80%, based on the total volume of the electrolyzer composite membrane.

Each of the at least two reinforcing layers of the reinforcing structure may have a microporous polymer structure content of at least 4 g·m$^{-2}$. Each of the at least two reinforcing layers of the reinforcing structure may have a microporous polymer structure content of from about 4 g·m$^{-2}$ to about 75 g·m$^{-2}$, or from about 4 g·m$^{-2}$ to about 60 g·m$^{-2}$, or from about 4 g·m$^{-2}$ to about 50 g·m$^{-2}$, or from about 4 g·m$^{-2}$ to about 40 g·m$^{-2}$, or from about 4 g·m$^{-2}$ to about 30 g·m$^{-2}$, or from about 4 g·m$^{-2}$ to about 20 g·m$^{-2}$, or from about 4 g·m$^{-2}$ to about 10 g·m$^{-2}$, or from about 10 g·m$^{-2}$ to about 70 g·m$^{-2}$, or from about 15 g·m$^{-2}$ to about 60 g·m$^{-2}$, or from about 20 g·m$^{-2}$ to about 40 g·m$^{-2}$, or from about 50 g·m$^{-2}$ to about 75 g·m$^{-2}$, or from about 10 g·m$^{-2}$ to about 50 g·m$^{-2}$, or from about 20 g·m$^{-2}$ to about 60 g·m$^{-2}$, or from about 60 g·m$^{-2}$ to about 75 g·m$^{-2}$, or from about 10 g·m$^{-2}$ to about 40 g·m$^{-2}$, based on the total area of the composite membrane.

In some embodiments, the equivalent volume of the ion exchange material is from about 240 cc/mol eq to about 870 cc/mol eq. The ion exchange material may have a total equivalent weight (EW) from about 400 g/mol eq to about 2000 g/mol eq $SO_3-$.

In various embodiments, the acid content of the composite membrane is greater than 1.2 meq/cc, for example from 1.2 meq/cc to 3.5 meq/cc at 0% relative humidity.

In various embodiments, the thickness of the composite membrane is from about 20 µm to about 250 µm, preferably from about 20 µm to about 120 µm. Specifically, according to embodiments, the thickness of the composite membrane is from about 20 µm to about 120 µm while the acid content of the composite membrane is kept between 1.2 meq/cc to 3.5 meq/cc.

The volume % of the microporous polymer structure in the composite membrane refers to the space occupied by the microporous polymer structure with respect to the total volume of the electrolyzer composite membrane. Accordingly, the volume % of the microporous polymer structure in the composite material is different than the volume % only in the imbibed layer which contains ionomer. The volume % of the microporous polymer structure in the composite material is affected by the humidity. The measurements discussed below regarding volume % are conducted at dry conditions (e.g. 0% relative humidity (RH)).

As provided above, it is surprising and unexpected that the puncture resistance of the composite membrane is dramatically improved by distributing the microporous polymer structure content within two or more reinforcing layers for any given content of microporous polymer structure and composite membrane thickness.

The electrolyzer composite membrane may have an average puncture failure force of at least about 60 gF (0.59 N), when measured according to the Average Puncture Force Failure Test described hereinbelow. For example, the composite membrane may have an average failure force of at least about 60 gF (0.59 N), or at least about 65 gF (0.64 N), or at least about 70 gF (0.69 N), or at least about 75 gF (0.74 N), or at least about 80 gF (0.78 N), or at least about 90 gF (0.88 N), when measured by the Average Puncture Force Failure Test described hereinbelow.

The electrolyzer composite membrane may have an average failure force of from about 60 gF (0.59 N) to about 160 gF (1.57 N), when measured according to the Average Puncture Force Failure Test described hereinbelow, or from about 60 gF (0.59 N) to about 80 gF, or from about 60 gF to about 80 gF, or from about 60 gF to about 75 gF, or from about 60 gF to about 70 gF, or from about 70 gF to about 90 gF, or from about 80 gF to about 90 gF, or from about 65 gF to about 75 gF, when measured by the Average Puncture Force Failure Test described hereinbelow.

The electrolyzer composite membrane may have an average failure force of about 60 gF, or about 65 gF, or about 70 gF, or about 75 gF, or about 80 gF, or about 85 gF, or about 90 gF, when measured by the Average Puncture Force Failure Test described hereinbelow.

The electrolyzer composite membrane may experience a hydrogen crossover of up to about 2%, or preferably up to 1% when measured by the hydrogen cross-over detection method described herein at 55° C. and 0.5 A/cm$^2$ and at operating differential pressures ranging from 2-30 bars. The electrolyzer composite membrane may experience a hydrogen crossover of from about 0% to about 2%, or from about 0% to about 1%, or from about 0.2% to about 1%, or from about 0.3% to about 1%, or from about 0.3% to about 0.9%, or from about 0.5% to about 1%, or from about 0.5% to about 1.5%, or from about 1% to about 2%, or from about 1.5% to about 2%, or from about 0.6% to about 1.2%, when measured by the hydrogen cross-over detection method described herein at 55° C. and 0.5 A/cm$^2$ and at operating differential pressures ranging from 2-30 bars.

Figure 17:
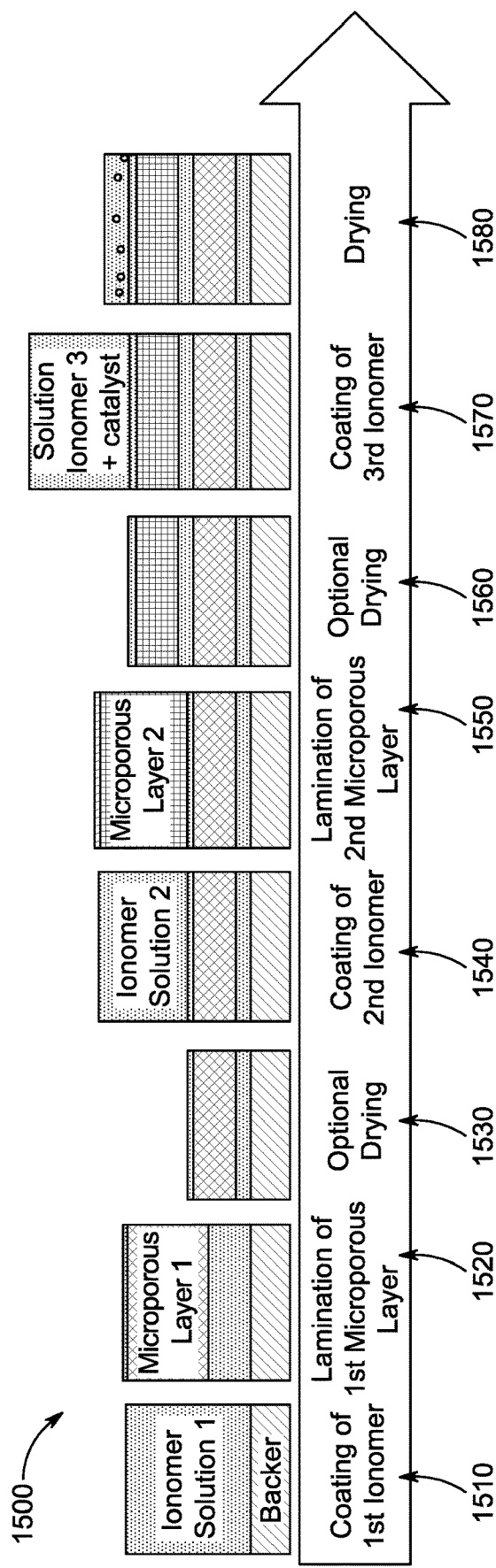
FIG. 17 shows a schematic representation of a method of manufacturing electrolyzer composite membranes embodiments of the present disclosure having reinforcing layers separated by internal ionomer layers and a layer of ionomer between the recombination catalyst and the reinforcing layer which is furthest away from the backer (in other words, the reinforcing layer which, in use, is configured to be closest to the anode).

The membranes were prepared by a sequential coating processes. For membranes that have internal layers of ionomer between reinforcing layers, the method 1500 (FIG. 17) comprises the following steps:

1510) coating a backer with the first ionomer by providing a backer layer and depositing a liquid layer of a first ionomer solution;

1520) depositing a first reinforcing layer comprising a microporous polymer structure over the liquid layer of ionomer and allowing the microporous polymer structure of the first reinforcing layer to become imbibed or at least partially imbibed with the first ionomer solution;

1530) optionally drying the laminate;

1540) coating the imbibed first reinforcing layer with a liquid layer of a second ionomer solution;

1550) depositing a second reinforcing layer comprising a microporous polymer structure over the liquid layer of the second ionomer solution and allowing the microporous polymer structure of the second reinforcing layer to become imbibed or at least partially imbibed with the second ionomer;

1560) optionally drying the laminate;

1570) coating the outermost surface of the laminate which is furthest away from the backer with a final liquid layer of a third ionomer solution mixed with recombination catalyst and allowing the microporous polymer structure to become at least partially imbibed with ionomer; and

1580) drying the laminate.

Optionally, the manufacturing method includes repeating steps 1560), 1570) and 1580) with further reinforcing layers and liquid layers of ionomer and drying the laminate. For example, for electrolyzer composite membranes comprising three reinforcing layers, a third liquid layer of a third ionomer solution may be deposited over the imbibed second reinforcing layer and applying a third reinforcing layer over the third layer of ionomer solution, and then the laminate may be dried. In some embodiments, the process comprises adding even further ionomer and reinforcing layers, and drying the laminate.

The recombination catalyst may be deposited mixed with ionomer prior to deposition on the laminate. In some embodiments, the recombination catalyst may comprise a precious metal (e.g. Pt) on a support (e.g. carbon particles) mixed with ionomer. Some of the recombination catalyst may become imbibed within the outermost reinforcing layer, but in any case, there must be at least some recombination catalyst disposed closer to the anode side than to the cathode side.

Membrane electrode assemblies may be prepared by depositing an anode on the surface of the electrolyzer composite membrane which has the recombination catalyst and depositing a cathode on the opposite surface of the electrolyzer composite membrane (i.e. the surface which does not have recombination catalyst).

The electrodes (i.e. anode and cathode) may be deposited by any suitable techniques known in the art. For example, solid electrode layers be pressed against the electrolyzer composite membrane by any suitable techniques. Alternatively, (liquid) electrode inks may be applied on the electrolyzer composite membrane. Upon drying the composite, the solvent of the electrode ink may dry to form a solid electrode layer. For the avoidance of doubt, the backer must be removed from the electrolyzer composite membrane before applying the cathode or cathode gas diffusion layer. The ionomers in the ionomer solutions employed in each of the ionomer layers (a.k.a. buttercoats) may be the same or different. The reinforcing layers employed in the electrolyte composite membrane may be all the same, or at least one of the reinforcing layers may be different

EXAMPLES

Test Procedures and Measurement Protocols Used in Examples

Bubble Point

The Bubble Point was measured according to the procedures of ASTM F316-86. Isopropyl alcohol was used as the wetting fluid to fill the pores of the test specimen. The Bubble Point is the pressure of air required to create the first continuous stream of bubbles detectable by their rise through the layer of isopropyl alcohol covering the microporous polymer matrix. This measurement provides an estimation of maximum pore size.

Non-Contact Thickness

A sample of microporous polymer structure was placed over a flat smooth metal anvil and tensioned to remove wrinkles. Height of microporous polymer structure on anvil was measured and recorded using a non-contact Keyence LS-7010M digital micrometer. Next, height of the anvil without microporous polymer matrix was recorded. Thickness of the microporous polymer structure was taken as a difference between micrometer readings with and without microporous structure being present on the anvil.

Mass-Per-Area

Each Microporous polymer structure was strained sufficient to eliminate wrinkles, and then a 10 cm² piece was cut out using a die. The 10 cm² piece was weighed on a conventional laboratory scale. The mass-per-area (M/A) was then calculated as the ratio of the measured mass to the known area. This procedure was repeated 2 times and the average value of the M/A was calculated.

Apparent Density of Microporous Polymer Structure

The apparent density of the microporous polymer structure was calculated using the non-contact thickness and mass-per-area data using the following formula:

$$\text{Apparent density}_{microporous\ polymer\ structure} = \frac{\{M/A_{microporous\ polymer\ structure}\}}{\{\text{non-contact thickness}\}} = [g/cc]$$

Porosity of Microporous Polymer Structure

The porosity of the microporous polymer structure was calculated using the apparent density and skeletal density data using the following formula:

$$\text{Porosity}_{microporous\ polymer\ structure} = \frac{\{\text{Apparent density}_{microporous\ polymer\ structure}\}}{\{\text{Skeletal density}_{microporous\ polymer\ structure}\}}$$

Solids Concentration of Solutions of Ion Exchange Material (IEM)

Herein, the terms "solution" and "dispersion" are used interchangeably when referring to ion exchange materials (IEMs). This test procedure is appropriate for solutions in which the IEM is in proton form, and in which there are negligible quantities of other solids. A volume of 2 cubic centimeters of IEM solution was drawn into a syringe and the mass of the syringe with solution was measured via a balance in a solids analyzer (obtained from CEM Corporation, USA). The mass of two pieces of glass fiber paper (obtained from CEM Corporation, USA) was also measured and recorded. The IEM solution was then deposited from the syringe into the two layers of glass fiber paper. The glass fiber paper with the ionomer solution was placed into the solids analyzer and heated up to 160° C. to remove the solvent liquids. Once the mass of the glass fiber paper and residual solids stopped changing with respect to increasing temperature and time, it was recorded. It is assumed that the residual IEM contained no water (i.e., it is the ionomer mass corresponding to 0% RH). After that, the mass of the emptied syringe was measured and recorded using the same balance as before. The ionomer solids in solution was calculated according to the following formula:

$$\{\text{wt \% solids of } IEM \text{ solution}\} = \frac{\{\text{Mass of glass fiber paper with residual solids}\} - \{\text{Mass of glass fiber paper}\}}{\{\text{Mass of full syringe}\} - \{\text{Mass of emptied syringe}\}}$$

Equivalent Weight (EW) of an IEM

The following test procedure is appropriate for IEM comprised of a single ionomer resin or a mixture of ionomer resins that is in the proton form (i.e., that contains negligible amounts of other cations), and that is in a solution that contains negligible other ionic species, including protic acids and dissociating salts. If these conditions are not met, then prior to testing the solution must be purified from ionic impurities according to a suitable procedure as would be known to one of ordinary skill in the art, or the impurities must be characterized and their influence on the result of the EW test must be corrected for.

As used herein, the EW of an IEM refers to the case when the IEM is in its proton form at 0% RH with negligible impurities. The IEM may comprise a single ionomer or a mixture of ionomers in the proton form. An amount of IEM solution with solids concentration determined as described above containing 0.2 grams of solids was poured into a plastic cup. The mass of the ionomer solution was measured via a conventional laboratory scale (obtained from Mettler Toledo, LLC, USA). Then, 5 ml of deionized water and 5 ml of 200 proof denatured ethanol (SDA 3C, Sigma Aldrich, USA) is added to ionomer solution in the cup. Then, 55 ml of 2N sodium chloride solution in water was added to the IEM solution. The sample was then allowed to equilibrate under constant stirring for 15 minutes. After the equilibration step, the sample was titrated with 1N sodium hydroxide solution. The volume of 1N sodium hydroxide solution that was needed to neutralize the sample solution to a pH value of 7 was recorded. The EW of the IEM ($EW_{IEM}$) was calculated as:

$$EW_{IEM} = \frac{\{\text{Mass of } IEM \text{ solution}\} \times \{\text{wt \% solids of } IEM \text{ solution}\}}{\{\text{Volume of NaOH solution}\} \times \{\text{Normality of NaOH solution}\}} = \left[\frac{g}{\text{mole eq.}}\right]$$

When multiple IEMs were combined to make a composite membrane, the average EW of the IEMs in the composite membrane was calculated using the following formula:

$$EW_{IEM} = \left[\frac{\left\{\begin{array}{c}\text{Mass fraction}\\\text{of } IEM\ 1\end{array}\right\}}{\{EW_{IEM,1}\}} + \frac{\left\{\begin{array}{c}\text{Mass fraction}\\\text{of } IEM\ 2\end{array}\right\}}{\{EW_{IEM,2}\}} + \ldots \frac{\left\{\begin{array}{c}\text{Mass fraction}\\\text{of } IEM\ N\end{array}\right\}}{\{EW_{IEM,N}\}}\right]^{-1} = \left[\frac{g}{\text{mole eq.}}\right],$$

where the mass fraction of each IEM is with respect to the total amount of all IEMs. This formula was used both for composite membranes containing ionomer blends and for composite membranes containing ionomer layers.

Equivalent Volume (EV) of Ion Exchange Material

As used herein, the Equivalent Volume of the IEM refers to the EV if that IEM were pure and in its proton form at 0% RH, with negligible impurities. The EV was calculated according to the following formula:

$$EV_{IEM} = \frac{\{\text{Equivalent Weight of } IEM\}}{\{\text{Volumetric density of } IEM \text{ at 0\% } RH\}} = \left[\frac{cc}{\text{mole eq.}}\right]$$

The Equivalent Weight of each IEM was determined in accordance with the procedure described above. The IEMs used in these application were perfluorosulfonic acid ionomer resins the volumetric density of perfluorosulfonic acid ionomer resin was taken to be 1.9 Woo at 0% RH.

Thickness of Composite Membrane

The composite membranes were equilibrated in the room in which the thickness was measured for at least 1 hour prior to measurement. Composite membranes were left attached to the substrates on which the composite membranes were coated. For each sample, the composite membrane on its coating substrate was placed on a smooth, flat, level marble slab. A thickness gauge (obtained from Heidenhain Corporation, USA) was brought into contact with the composite membrane and the height reading of the gauge was recorded in six different spots arranged in grid pattern on the membrane. Then, the sample was removed from the substrate, the gauge was brought into contact with the substrate, and the height reading was recorded again in the same six spots. The thickness of the composite membrane at a given relative humidity (RH) in the room was calculated as a difference between height readings of the gauge with and without the composite membrane being present. The local RH was measured using an RH probe (obtained from Fluke Corporation). The thickness at 0% RH was calculated using the following general formula:

$$\text{Composite membrane thickness at } 0\% \; RH =$$

$$\left\{ \frac{\text{Composite membrane thickness at room } RH - \frac{M/A_{microporous\;polymer\;structure}}{\text{Density}_{microporous\;polymer\;structure}}}{1 + \frac{\lambda_{room\;RH}}{EW_{ionomer\_average}} * \frac{\text{Molecular weight}_{water}}{\text{Density}_{water}} * \text{Density}_{water}} \right\} **$$

$$\left( 1 + \frac{\lambda_{RH=0\%}}{EW_{ionomer\;average}} * \frac{\text{Molecular weight}_{water}}{\text{Density}_{water}} * \text{Density}_{ionomer} \right) +$$

$$\frac{M/A_{microporous\;polymer\;structure}}{\text{Density}_{microporous\;polymer\;structure}} == [\text{micron}]$$

where the parameter $\lambda$ corresponds to the water uptake of the Ion Exchange Material in terms of moles of water per mole of acid group at a specified RH. For PFSA ionomer, the values for $\lambda$ at any RH in the range from 0 to 100% in gas phase were calculated according the following formula:

$$\lambda = 80.239 \times RH^6 - 38.717 \times RH^5 - 164.451 \times RH^4 + 208.509 \times RH^3 - 91.052 \times RH^2 + 21.740 \times RH^1 + 0.084$$

Microporous Polymer Structure (MPS) Volume Content of Composite Membrane

The volume % of the Microporous Polymer Structure in each Composite Membrane was calculated according to the following formula:

$$\% \; Vol_{MPS} = \frac{\left( \frac{M/A_{microporous\;polymer\;structure}}{\text{Matrix skeletal density}_{microporous\;polymer\;structure}} \right)}{\text{Composite membrane thickness at } 0\% \; RH} = [\%]$$

The Microporous Polymer Matrices used in these examples were ePTFE and track etched porous polycarbonate. The matrix skeletal density of ePTFE was taken to be 2.25 g/cc and of track etched porous polycarbonate was taken to be 1.20 g/cc.

Acid Content of Composite Membrane

Acid content of composite membranes was calculated according to the following formula:

$$\text{Acid Content} = \frac{\left( \text{Composite membrane thickness at } 0\% \; RH - \frac{M/A_{microporous\;polymer\;structure}}{\text{Matrix density}_{microporous\;polymer\;structure}} \right) \times \text{Density}_{ionomer}}{EW_{ionomer}} \times$$

$$\frac{1}{\text{Composite membrane thickness at } 0\% \; RH} = \left[ \frac{\text{mole eq}}{cc} \right]$$

Ball Burst Test of Composite Microporous Layer

The mechanical strength of a composite membrane prepared in accordance with the present invention was measured by subjecting a sample to a load pressure.

A sample was fixed taut in a frame with a 45 mm diameter opening. The sample in the frame was placed into an universal testing machine AG-I of Shimadzu Corporation, Japan with an environmentally controlled chamber with the temperature and relative humidity inside of the chamber being 23° C. and 80%, respectively. A steel ball with a diameter of 6.35 mm, supported on a post, was pressed into the suspended membrane at a constant rate of 100 mm/min. The maximum load generated by the system at the sample's break was recorded and that value is called the ball burst strength.

Average Puncture Force Failure Test

A Texture Analyzer (Stable Micro Systems TA XT plus) is used to drive a puncture probe (Becton Dickinson 18G 1-½ PrecisionGlide Needle) into a membrane until the probe punctures through the sample. The membrane is fastened against a carbon felt (such as Sigracell GFD 4.6EA) such that the membrane is supported by the felt and exposed to the puncture probe. The puncture probe is driven at a rate of 0.1 mm/s while measuring force at a corresponding probe displacement. The puncture force is the maximum force observed before the sample mechanically fails and the force drops sharply. Reported values are the average of five replicate tests.

Hydrogen Crossover Test

The hydrogen crossover of the examples were determined by gas chromatography with TCD detector (10 ppm detectability limit). Example electrolyzer composite membranes were tested for hydrogen crossover by TNO (The Netherlands Organisation for applied scientific research) in a bespoke electrolyzer cell with fixed operation conditions at 55° C. and 0.5 A/cm$^2$ and under differential electrode pressure in a range of 2-30 bar. Hydrogen crossover was measured with by increasing the pressure differential between cathode and anode at the cathode by two bars every 30 minutes.

EXAMPLES

The composite membranes of the present disclosure may be better understood by referring to the following non-limiting examples.

To determine characteristics such as acid content, volume, and puncture resistance of the composite membrane and properties of the test procedures and measurement protocols were performed as described above. Table 1 (FIG. 15) illustrates the properties of electrolyzer composite membranes of examples 1, 2, and 3 according to embodiments of the invention as well as comparative examples 1 and 2 and Commercial membranes Nafion™ N115, N212, and N211 (Chemours).

Ion Exchange Materials Manufactured in Accordance with Aspects of the Present Disclosure for All Examples All ion exchange materials used in the following examples are perfluorosulfonic acid (PFSA) based ionomers with the specified equivalent weight (EW) in Table 1. All ionomers prior to manufacturing of composite membranes were in the form of solutions based on water and ethanol mixtures as solvent with water content in solvent phase being less than 50%.

A commonly known ion exchange material was used to produce a composite membrane of the present disclosure. A preferable example is a solution obtained by dispersing or dissolving a solid PFSA ionomer represented by the following general formula (wherein a:b=1:1 to 9:1 and n=0, 1, or 2) in a solvent.

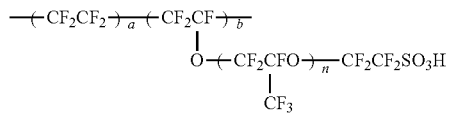

In some aspects, the solvent is selected from the group consisting of: water; alcohols such as methanol, ethanol, propanol, n-butylalcohol, isobutylalcohol, sec-butylalcohol, and tert-butylalcohol; pentanol and its isomers; hexanol and its isomers; hydrocarbon solvents such as n-hexane; ether-based solvents such as tetrahydrofuran and dioxane; sulfoxide-based solvents such as dimethylsulfoxide and diethylsulfoxide; formamide-based solvents such as N,N-dimethylformamide and N,N-diethylformamide; acetamide-based solvents such as N,N-dimethylacetamide and N,N-diethylacetamide; pyrrolidone-based solvents such as N-methyl-2-pyrrolidone and N-vinyl-2-pyrrolidone; 1,1,2,2-tetrachloroethane 1,1,1,2-tetrachloroethale, 1,1,1-trichloroethane 1,2-dichloroethane trichloroethylene; tetrachloroethylene; dichloromethane; and chloroform. In the present disclosure, the solvent is optionally selected from the group consisting of water, methanol, ethanol, propanol. Water and the above solvents may be used alone or in combinations of two or more.

Inventive Example 1

Inventive example 1 was prepared according to the following procedure: an ePTFE membrane of type 1 (ePTFE 1 in Tables 1 and 2) with mass per area of about 10 g/m², a thickness of 14 μm, an apparent density of 0.16 g/cc and a bubble point of 56.2 psi was used for all the reinforcing layers. A PSFA solution as IEM with EW=710 g/mol eq SO₃− (obtained from E. I. du Pont de Nemours and Company), IEM solution composition of 36% water, 47% ethanol, 17% solids, was coated as first laydown onto the top side of a backer layer. The backer layer (obtained from DAICEL VALUE COATING LTD., Japan) comprised PET and a protective layer of cyclic olephin copolymer (COC), and was oriented with the COC side on top. The coating was accomplished using a drawdown bar with theoretical wet coating thickness of about 215 μm. While the coating was still wet, a first reinforcing layer of ePTFE membrane restrained on metal frame was laminated to the IEM laydown, whereupon the IEM solution imbibed into the pores of the first ePTFE membrane. This first intermediate composite material was subsequently dried in a convection oven with air inside at a temperature of 125° C. Upon drying, the microporous polymer structure of the first ePTFE membrane became fully imbibed with the IEM. A second laydown of the same solution of IEM was coated onto the top surface of the first intermediate composite material (the surface opposite the backer layer) using a drawdown bar with theoretical wet coating thickness of about 215 μm. While the coating was still wet, a second reinforcing layer of ePTFE membrane previously restrained on metal frame was laminated to the second IEM laydown, whereupon the IEM solution imbibed into the pores of the second ePTFE membrane. This second intermediate composite material was subsequently dried in a convection oven with air inside at a temperature of 125° C. A third laydown of the same solution of IEM was coated onto the top surface of the second intermediate composite material using a drawdown bar with theoretical wet coating thickness of about 215 μm. While the coating was still wet, a third reinforcing layer of ePTFE membrane previously restrained on metal frame was laminated to the third IEM laydown, whereupon the IEM solution imbibed into the pores of the third ePTFE membrane. This third intermediate composite material was subsequently dried in a convection oven with air inside at a temperature of 125° C. A fourth laydown of the same solution of IEM mixed with recombination catalyst 0.085 mg/cm2 of Pt on carbon was coated onto the top surface of the third intermediate composite material using a drawdown bar with theoretical wet coating thickness of about 150 μm. This final composite material was subsequently dried in a convection oven with air inside at a temperature of 165° C. The multilayer composite membrane was fully occlusive and had a layer of IEM on each outer side and in between each of the three fully occluded reinforcing layers that have a separation spacing of about 10-12 μm. Furthermore one of the outer IEM layers is the recombination catalyst layer formed as outermost layer. The resulting electrolyzer composite membrane had a thickness at 50% RH of 80-90 μm.

Inventive Example 2

Inventive example 2 was prepared according to the following procedure: the ePTFE membrane type 1 as described in inventive example 1 was used for all the reinforcing layers. A PSFA solution as IEM with EW=710 g/mol eq SO₃− (obtained from E. I. du Pont de Nemours and Company), IEM solution composition of 36% water, 47% ethanol, 17.0% solids, was coated as first laydown onto the top side of a backer layer. The backer layer (obtained from DAICEL VALUE COATING LTD., Japan) comprised PET and a protective layer of cyclic olephin copolymer (COC), and was oriented with the COC side on top. The coating was accomplished using a drawdown bar with theoretical wet coating thickness of about 115 μm. While the coating was still wet, a first reinforcing layer of ePTFE membrane previously restrained on metal frame was laminated to the IEM laydown, whereupon the IEM solution imbibed into the pores of the first ePTFE membrane. This first intermediate composite material was subsequently dried in a convection oven with air inside at a temperature of 125° C. Upon drying, the microporous polymer structure of the first ePTFE membrane became fully imbibed with the IEM. A second laydown of the same solution of IEM was coated onto the top surface of the first intermediate composite membrane (the surface opposite the backer layer) using a drawdown bar with theoretical wet coating thickness of about 150 μm. While the coating was still wet, a second reinforcing layer of ePTFE membrane previously restrained on metal frame was laminated to the second IEM laydown, whereupon the IEM solution imbibed into the pores of the second ePTFE membrane. This second intermediate composite material was subsequently dried in a convection oven with air inside at a temperature of 125° C. A third laydown of the same solution of IEM was coated onto the top surface of the top surface of the second intermediate composite material) using a drawdown bar with theoretical wet coating thickness of about 150 μm. While the coating was still wet, a third reinforcing layer of ePTFE membrane previously restrained on metal frame was laminated to the third IEM laydown, whereupon the IEM solution imbibed into the pores of the third ePTFE membrane. This third intermediate composite material was subsequently dried in a convection oven with air inside at a temperature of 125° C. A fourth laydown of the same solution of IEM mixed with a recombination catalyst 0.04 mg/cm$^2$ of Pt on carbon was coated onto the top surface of the third intermediate composite material using a drawdown bar with theoretical wet coating thickness of about 66 μm. This final composite material was subsequently dried in a convection oven with air inside at a temperature of 165° C. The multilayer composite membrane was fully occlusive and had a layer of IEM on each outer side and in between each of the three fully occluded reinforcing layers that have a separation spacing of about 2-4 μm. Furthermore one outer layer of IEM forms the recombination catalyst. The resulting composite membrane had a thickness at 50% RH of about 40-50 micron.

Inventive Example 3

Inventive example 3 was prepared according to the following procedure: an ePTFE membrane of type 2 (ePTFE 2 in Tables 1 and 2) with mass per area of about 29 g/m$^2$, a thickness of 29 μm, an apparent density of 0.22 g/cc and a bubble point of 43.5 psi was used as reinforcing layer. A PSFA solution as IEM with EW=710 g/mol eq SO$_3$- (obtained from E. I. du Pont de Nemours and Company), IEM solution composition of 38.3% water, 43% ethanol, 18.7% solids, was coated as first laydown onto the top side of a backer layer. The backer layer (obtained from DAICEL VALUE COATI NG LTD., Japan) comprised PET and a protective layer of cyclic olephin copolymer (COC), and was oriented with the COC side on top. The coating was accomplished using a drawdown bar with theoretical wet coating thickness of about 231 μm. While the coating was still wet, a first reinforcing layer of ePTFE membrane 2 restrained on metal frame was laminated to the IEM laydown, whereupon the IEM solution imbibed into the pores of the first ePTFE membrane. This first intermediate composite material was subsequently dried in a convection oven with air inside at a temperature of 125° C. Upon drying, the microporous polymer structure of the first ePTFE membrane became fully imbibed with the IEM. A second laydown of the same solution of IEM was coated onto the top surface of the first intermediate composite material (the surface opposite the backer layer) using a drawdown bar with theoretical wet coating thickness of about 231 μm. While the coating was still wet, a second reinforcing layer of ePTFE membrane 2 previously restrained on metal frame was laminated to the second IEM laydown, whereupon the IEM solution imbibed into the pores of the second ePTFE membrane. This second intermediate composite material was subsequently dried in a convection oven with air inside at a temperature of 125° C. A third laydown of IEM solution composition of 46% water, 41.6% ethanol, 12.4% solids the same solution of IEM mixed with recombination catalyst 0.085 mg/cm2 of Pt on carbon was coated onto the top surface of the second intermediate composite material using a drawdown bar with theoretical wet coating thickness of about 132 μm. This final composite material was subsequently dried in a convection oven with air inside at a temperature of 165° C. The multilayer composite membrane was fully occlusive and had a layer of IEM on each outer side and in between each of the two fully occluded reinforcing layers that have a separation spacing of about 10-12 μm. Furthermore one of the outer IEM layers is the recombination catalyst layer formed as outermost layer. The resulting electrolyzer composite membrane had a thickness at 50% RH of 80-90 μm.

Comparative Example 1

Comparative example 1 was prepared according to the following procedure: an ePTFE membrane of type 2 with mass per area of about 29 g/m$^2$, a thickness of 29 μm, an apparent density of 0.22 g/cc and a bubble point of 43.5 psi was used as reinforcing layer. A PSFA solution as IEM with EW=710 g/mol eq SO$_3$- (obtained from E. I. du Pont de Nemours and Company), IEM solution composition of 38.3% water, 43% ethanol, 18.7% solids, was coated as first laydown onto the top side of a backer layer. The backer layer (obtained from DAICEL VALUE COATING LTD., Japan) comprised PET and a protective layer of cyclic olephin copolymer (COC), and was oriented with the COC side on top. The coating was accomplished using a drawdown bar. While the coating was still wet, a first reinforcing layer of ePTFE membrane 2 restrained on metal frame was laminated to the IEM laydown, whereupon the IEM solution imbibed into the pores of the first ePTFE membrane. This first intermediate composite material was subsequently dried in a convection oven with air inside at a temperature of 125° C. Upon drying, the microporous polymer structure of the first ePTFE membrane became fully imbibed with the IEM. A second laydown of the same solution of IEM was coated onto the top surface of the first intermediate composite material (the surface opposite the backer layer) using a drawdown bar. This final composite material was subsequently dried in a convection oven with air inside at a temperature of 165° C. The multilayer composite membrane was fully occlusive and had a layer of IEM on each outer side with a thickness of 25.35 μm. The resulting electrolyzercomposite membrane had a thickness at 50% RH of 80.2 μm.

Comparative Example 2

Comparative example 2 was prepared according to the following procedure: an ePTFE membrane of type 2 with mass per area of about 29 g/m$^2$, a thickness of 29 μm, an apparent density of 0.22 g/cc and a bubble point of 43.5 psi was used as reinforcing layer. A PSFA solution as IEM with EW=710 g/mol eq SO$_3$- (obtained from E. I. du Pont de Nemours and Company), IEM solution composition of 38.3% water, 43% ethanol, 18.7% solids, was coated as first laydown onto the top side of a backer layer. The backer layer (obtained from DAICEL VALUE COATING LTD., Japan) comprised PET and a protective layer of cyclic olephin copolymer (COC), and was oriented with the COC side on top. The coating was accomplished using a drawdown bar. While the coating was still wet, a first reinforcing layer of ePTFE membrane 2 restrained on metal frame was laminated to the IEM laydown, whereupon the IEM solution imbibed into the pores of the first ePTFE membrane. This first intermediate composite material was subsequently dried in a convection oven with air inside at a temperature of 125° C. Upon drying, the microporous polymer structure of the first ePTFE membrane became fully imbibed with the IEM. A second laydown of the same solution of IEM was coated onto the top surface of the first intermediate composite material (the surface opposite the backer layer) using a drawdown bar. This final composite material was subsequently dried in a convection oven with air inside at a temperature of 165° C. The multilayer composite membrane was fully occlusive and had a layer of IEM on each outer side with a thickness of 5.45 μm. The resulting electrolyzer composite membrane had a thickness at 50% RH of 40.4 μm.

Figure 13:
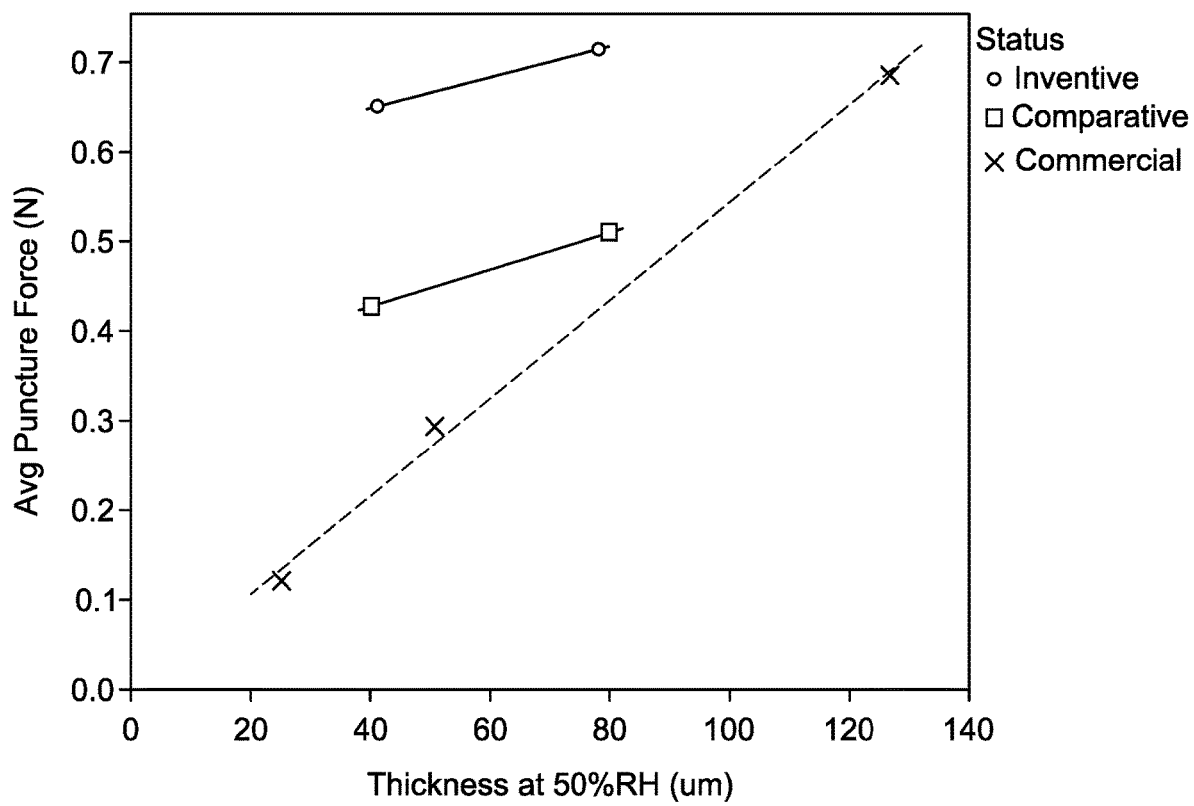
FIG. 13 shows a graph representing the average failure force (N) of the membranes of the examples presented in Table 1 against the thickness of the electrolyzer composite membranes at 50% RH (μm). The data points at around 80 μm correspond to Example 21 and Comparative Example 1 respectively, the data points at around 40 μm correspond to Example 2 and Comparative Example 2 respectively, and the cross corresponds to Commercial Nafion membranes N115, N212, and N211.

The properties of the composite membranes of the examples are presented in Table 1 (FIG. 15). The properties of the microporous polymer structures employed in the composite membranes are presented in Table 2 (FIG. 16). The average puncture force of the samples is illustrated in FIG. 13, which shows a graph comparing the average failure force of comparable composite membranes (Example 1 compared and Comparative Example 1 and Example 2 and Comparative Example 2 respectively) with the puncture force of the composite membranes, plotted against the thickness at 50% RH of each electrolyzer composite membrane (μm). The graph also shows the puncture force for commercial Nafion™ membranes N115, N212, and N211.

Discussion of Results

As seen in FIG. 13, the commercial Nafion N115 membrane has comparable puncture force even though it is significantly thicker than Example 1 (122 μm vs 80-90 μm) and Example 2 (122 μm vs 40 μm). Improvement in puncture force due to reinforcement is apparent when comparing Nafion N212 with Example 2 and Comparative Example 2 (50 μm vs 40 μm).

Surprisingly, these data show that, for a given membrane thickness (and with a similar total content of microporous polymer structure in an electrolyzer composite membrane), distributing the microporous polymer structure over at least two reinforcing layers results in a significantly improved average failure pressure compared with distributing the same PEM thickness and total content of microporous polymer structure in a single reinforcing layer. Composite membranes according to this disclosure therefore are highly desirable because they have superior resistance to piercing by electrolyzer elements upon electrolyzer fabrication, without compromising the performance of the membranes.

Figure 14:
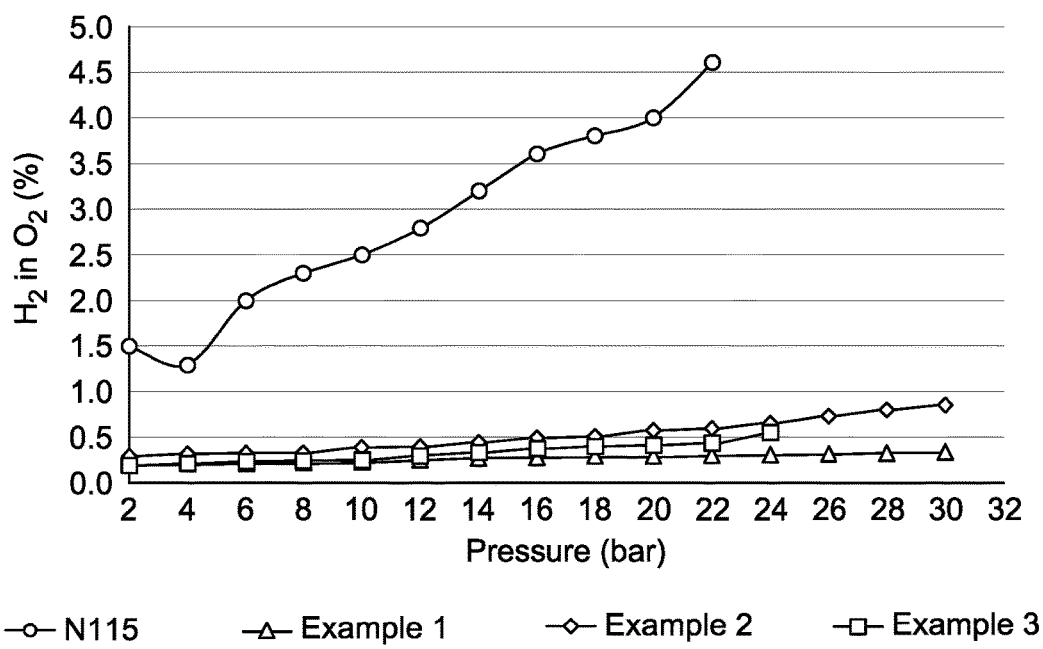
FIG. 14 shows a graph representing hydrogen crossover experienced in electrolyzers with commercial membrane Nafion™ N115, and the membranes of inventive Examples 1, 2, and 3 measured by the hydrogen crossover test defined herein at 55° C., a current density 0.5 A/cm² and differential anode pressure of 2 bars.

As shown in Table 1 and on FIG. 14, inventive examples, the addition of a recombination catalyst to the membranes at an outermost surface of the membrane which is adjacent to or in contact with the anode significantly reduces the hydrogen cross-over to the anode compared to commercial Nafion™ N115. Additionally, it is worth noting that the hydrogen crossover for the commercial membrane exceeded the safety limit of 2% $H_2$ in $O_2$ at around 8 bar, and the experiment had to be stopped at 22 bar as the hydrogen crossover had exceeded the explosive limit of 4% $H_2$ in $O_2$. In contrast, all three inventive examples had hydrogen crossovers well below the safety limit of 2% $H_2$ in $O_2$ even at high pressures of 24 to 30 bar. In particular, Example 1 was the most stable with very minimal increase of hydrogen crossover with the increase of pressure. It is worth noting that Example 2, which is about half the thickness of Example 1, also had very low hydrogen crossover and was able to withstand high pressures up to 30 bar. Example 3, which has a similar thickness and total content reinforcement material to Example 1, but has two reinforcing layers rather than 3 and a higher recombination catalyst loading also presented very low hydrogen crossover and was able to withstand up to 24 bars of pressure. Therefore, increasing the number of reinforcing layers beyond 2 confers further mechanical resistance to the membranes. Adding a recombination catalyst helps to ensure that the hydrogen crossover is maintained below the explosive limit of 4% $H_2$ in $O_2$.

While the invention has been described in detail, modifications within the spit aid scope of the invention will be readily apparent to the skilled artisan. It may be understood that aspects of the invention and portions of various embodiments and various features recited above and/or in the appended claims may be combined or interchanged either in whole or in part. In the foregoing descriptions of the various embodiments, those embodiments which refer to another embodiment may be appropriately combined with other embodiments as will be appreciated by the skilled artisan. Furthermore, the skilled artisan will appreciate that the foregoing description is by way of example only, and is not intended to limit the invention.

The invention claimed is:

1. An electrolyzer composite membrane, comprising:
   a) a reinforcing structure comprising at least two reinforcing layers, each of said at least two reinforcing layers comprising a microporous polymer structure; and
   b) an ion exchange material (IEM) at least partially imbibed within the microporous polymer structure of each of the at least two reinforcing layers and rendering the microporous polymer structure occlusive; and
   c) a recombination catalyst, wherein the recombination catalyst is configured to be disposed closer to an anode than to a cathode of an electrolyzer composite membrane-electrode assembly (MEA) and in direct contact with the anode, such that the recombination catalyst is on an outermost surface of the electrolyzer composite membrane and extends into the electrolyzer composite membrane from the outermost surface such that recombination catalyst is imbibed within at least one of the reinforcing layers of the electrolyzer composite membrane, wherein the electrolyzer composite membrane has a thickness at 50% RH of at least about 20 μm and the recombination catalyst extends from the outermost surface into the electrolyzer composite membrane in a range of from 1% to 50% of the thickness of the electrolyzer composite membrane.

2. The electrolyzer composite membrane according to claim 1, wherein the recombination catalyst is present in a recombination catalyst layer configured to be disposed adjacent the anode of the electrolyzer composite membrane electrode assembly (MEA).

3. The electrolyzer composite membrane according to claim 1, wherein the reinforcing structure defines a cathode outermost surface configured to be disposed closer to the cathode than to the anode in the electrolyzer composite membrane electrode assembly and an anode outermost surface configured to be disposed closer to the anode than to the cathode in the electrolyzer composite membrane electrode assembly, and
   wherein each of the at least two reinforcing layers defines a first surface and a second surface opposite the first surface, and wherein the first surface of a reinforcing layer that is configured to be disposed at or near the cathode is the cathode outermost surface and the second surface of a reinforcing layer that is configured to be disposed at or near the anode is the anode outermost surface.

4. The electrolyzer composite membrane according to claim 1, wherein the recombination catalyst comprises a single recombination catalyst species or a mixture of recombination catalyst species.

5. The electrolyzer composite membrane according to claim 1, wherein the recombination catalyst is mixed with the ion exchange material, and/or wherein the recombination catalyst is present on a recombination catalyst support material, such as carbon particulate.

6. The electrolyzer composite membrane according to claim 1, wherein the composite membrane has a thickness at 50% RH of up to about 250 μm.

7. The electrolyzer composite membrane according to claim 1, wherein the total volume of microporous polymer structure in the electrolyzer composite membrane is at least about 10 vol % based on the total volume of the composite membrane.

8. The electrolyzer composite membrane according to claim 1, wherein the electrolyzer composite membrane defines a first composite membrane surface and a second composite membrane surface opposite the first composite membrane surface, and
wherein the ion exchange material is present in at least one layer at the first composite membrane surface and/or the second composite membrane surface.

9. The electrolyzer composite membrane according to claim 8, wherein at least one of:
the electrolyzer composite membrane comprises a first layer of ion exchange material on the first composite membrane surface; and/or
the electrolyzer composite membrane comprises a second layer of ion exchange material on the second composite membrane surface.

10. The electrolyzer composite membrane according to claim 9, wherein the first layer of ion exchange material comprises the recombination catalyst, and wherein the first layer of ion exchange material is configured to be disposed in direct contact with the anode of the electrolyzer membrane electrode assembly (MEA).

11. The electrolyzer composite membrane according to claim 9, wherein at least one further layer of ion exchange material is present on the second layer of ion exchange material.

12. The electrolyzer composite membrane according to claim 1, wherein the recombination catalyst layer comprises one or more recombination catalyst species and at least one of an ion exchange material or a support, such as carbon particulate.

13. The electrolyzer composite membrane according to claim 1, wherein the recombination catalyst comprises a platinum group metal (Group 10 metal) such as platinum, palladium, iridium, rhodium, ruthenium or osmium; alloys of platinum group metals; and mixed oxides of platinum group metals with other metals such as cerium and titanium, and mixtures thereof; or wherein the recombination catalyst comprises one or more of Pt, Ir, Ni, Co, Pd, Ti, Sn, Ta, Nb, Sb, Pb, Mn, and Ru, their oxides and mixtures thereof.

14. The electrolyzer composite membrane according to claim 1, wherein a composition of the at least two reinforcing layers of the reinforcing structure is the same, or wherein a composition of the at least two reinforcing layers of the reinforcing structure is different.

15. The electrolyzer composite membrane according to claim 1, comprising three reinforcing layers.

16. The electrolyzer composite membrane according to claim 1, wherein the microporous polymer structure comprises at least one fluorinated polymer.

17. The electrolyzer composite membrane according to claim 16, wherein the fluorinated polymer is polytetrafluoroethylene (PTFE), poly(ethylene-co-tetrafluoroethylene) (EPTFE), expanded polytetrafluoroethylene (ePTFE), polyvinylidene fluoride (PVDF), expanded polyvinylidene fluoride (ePVDF), expanded poly(ethylene-cotetrafluoroethylene) (eEPTFE) or mixtures thereof.

18. The electrolyzer composite membrane according to claim 16, wherein the fluorinated polymer is expanded polytetrafluoroethylene (ePTFE).

19. The electrolyzer composite membrane according to claim 18, wherein the total content of microporous polymer structure in the electrolyzer composite membrane is at least about 8 g·m$^{-2}$ based on the total area of the composite membrane, optionally wherein the total content of microporous polymer structure in the electrolyzer composite membrane is from about 8 g·m$^{-2}$ to about 80 g·m$^{-2}$ based on the total area of the composite membrane.

20. The electrolyzer composite membrane according to claim 18, wherein each of the at least two reinforcing layers has a microporous polymer structure content of at least 5 g·m$^{-2}$, optionally from about 5 g·m$^{-2}$ to about 75 g·m$^{-2}$ based on the total area of the composite membrane.

21. The electrolyzer composite membrane according to claim 1, wherein the microporous polymer structure comprises a hydrocarbon polymer, optionally wherein the hydrocarbon polymer comprises polyethylene, polypropylene, polycarbonate, polystyrene, polysulfone, PES, PEN, or mixtures thereof.

22. The electrolyzer composite membrane according to claim 1, wherein the at least two reinforcing layers are in direct contact.

23. The electrolyzer composite membrane according to claim 1, wherein the at least two reinforcing layers are separated by a distance d, optionally wherein the distance d is from about 0.1 μm to about 20 μm at 50% RH, further optionally wherein the distance d is from about 2 μm to about 12 μm at 50% RH.

24. The electrolyzer composite membrane according to claim 23, wherein the composite membrane comprises at least one internal layer of ion exchange material between the at least two reinforcing layers, optionally wherein the composite membrane comprises two internal layers of ion exchange material, and wherein each internal layer of ion exchange material is sandwiched between two of the reinforcing layers.

25. The electrolyzer composite membrane according to claim 1, wherein the ion exchange material comprises more than one layer of ion exchange material, wherein the layers of ion exchange material are formed of the same ion exchange material.

26. The electrolyzer composite membrane according to claim 1, wherein the ion exchange material comprises more than one layer of ion exchange material,
wherein a first layer of ion exchange material is formed of different ion exchange materials than ion exchange materials of a second layer of ion exchange material.

27. The electrolyzer composite membrane according to claim 1, wherein the microporous polymer structure is fully imbibed with the ion exchange material.

28. The electrolyzer composite membrane according to claim 1,
- wherein the microporous polymer structure of each of the reinforcing layers has a first surface and a second surface; and
- wherein the ion exchange material forms a layer on at least one of the first surface or the second surface of each of the reinforcing layers.

29. An electrolyzer composite membrane according to claim 1, wherein the recombination catalyst extends into the electrolyzer composite membrane from $1/5$ to $1/25$ of the thickness of the electrolyzer composite membrane from $1/25$ to $1/10$ of the thickness of the electrolyzer composite membrane or from $5/100$ to $1/10$ of the thickness of the electrolyzer composite membrane or from $1/100$ to $5/100$ of the thickness of the electrolyzer composite membrane.

\* \* \* \* \*